United States Patent
Knott et al.

(10) Patent No.: US 12,494,091 B2
(45) Date of Patent: Dec. 9, 2025

(54) SYSTEMS AND METHODS OF CONTROLLING AN AIR COMPRESSOR

(71) Applicant: Rivian IP Holdings, LLC, Plymouth, MI (US)

(72) Inventors: Michael Adkins Knott, San Mateo, CA (US); Andrea Marie Best, Mountain View, CA (US); Erik Robert Glaser, San Mateo, CA (US); Tyree Worthy, South San Francisco, CA (US); Dax Chatfield Inman, Newport Beach, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 163 days.

(21) Appl. No.: 18/147,926

(22) Filed: Dec. 29, 2022

(65) Prior Publication Data

US 2024/0221437 A1    Jul. 4, 2024

(51) Int. Cl.
*G07C 5/00* (2006.01)
*B60C 23/10* (2006.01)
*G06F 3/04847* (2022.01)
*G06V 20/56* (2022.01)

(52) U.S. Cl.
CPC ............ *G07C 5/008* (2013.01); *B60C 23/10* (2013.01); *G06F 3/04847* (2013.01); *G06V 20/56* (2022.01)

(58) Field of Classification Search
CPC .... G07C 5/008; G06F 3/04847; G06V 20/56; B60C 23/10
USPC .......................................................... 701/36
See application file for complete search history.

(56) References Cited

U.S. PATENT DOCUMENTS

| | | | |
|---|---|---|---|
| 6,408,902 B1 * | 6/2002 | Liau | A63H 27/10 |
| | | | 141/105 |
| 9,860,361 B1 | 1/2018 | Hall et al. | |
| 2012/0191306 A1 * | 7/2012 | Baldwin | F16H 57/0416 |
| | | | 192/113.2 |
| 2019/0070907 A1 * | 3/2019 | Dudar | F02B 39/10 |
| 2021/0129802 A1 * | 5/2021 | Strong | F04B 49/06 |

(Continued)

FOREIGN PATENT DOCUMENTS

| | | | |
|---|---|---|---|
| DE | 38 06 322 A1 | 9/1989 | |
| DE | 10 2018 121 587 A1 | 3/2019 | |

(Continued)

OTHER PUBLICATIONS

"Cordless Compressor Air Pump with OLED display, Bluetooth and app, up to 8 bar / 120 psi", AGT, Pearl.GmbH, dated Mar. 25, 2022.

(Continued)

*Primary Examiner* — Isaac G Smith
(74) *Attorney, Agent, or Firm* — Foley & Lardner LLP

(57) ABSTRACT

Systems and methods of controlling an air compressor are provided. A system of a vehicle can establish a bi-directional connection with a controller of an air compressor of the vehicle. The system can present, via a graphical user interface displayed on a display device, an icon for a preset configured with a target pressure for a type of object. The system can transmit, via the bi-directional connection responsive to a selection of the preset, an instruction to the controller to activate the air compressor to inflate the object to the target pressure.

18 Claims, 15 Drawing Sheets

(56) References Cited

U.S. PATENT DOCUMENTS

2022/0134811 A1    5/2022  Pamphile
2023/0058986 A1*   2/2023  Hosu ..................... G06T 7/0002

FOREIGN PATENT DOCUMENTS

| DE | 10 2019 208 485 A1 | 8/2020 | |
|----|----|----|----|
| EP | 3243671 A1 * | 11/2017 | |
| EP | 3944995 A1 * | 2/2022 | ............. G06V 30/19 |
| WO | WO-2016198589 A1 * | 12/2016 | ............. B60C 23/00 |
| WO | WO-2021152763 A1 * | 8/2021 | |

OTHER PUBLICATIONS

Examination Report on DE Appl. No. 102023121598.1 dated Oct. 17, 2025.

\* cited by examiner

SYSTEMS AND METHODS OF CONTROLLING AN AIR COMPRESSOR

INTRODUCTION

Vehicles can include various components.

SUMMARY

At least one aspect is directed to a system. The system can include a data processing system of a vehicle. The data processing system can include one or more processors coupled with a memory. The data processing system can establish a bi-directional connection with a controller of an air compressor of the vehicle. The data processing system can present, via a graphical user interface displayed on a display device, an icon for a preset configured with a target pressure for a type of object. The data processing system can transmit, via the bi-directional connection responsive to a selection of the preset, an instruction to the controller to activate the air compressor to inflate the type of object to the target pressure.

At least one aspect is directed to a system. The system can include a data processing system of a vehicle configured to receive, from a controller prior to activation of an air compressor, a first value of a pressure measured for an object couple to the air compressor. The data processing system can receive, from the controller subsequent to transmission of the instruction and activation of the air compressor, a second value of a pressure measured for an object coupled to the air compressor. The data processing system can provide, via a graphical user interface, a progress bar that indicates the first value of the pressure, the second value of the pressure, and the target pressure selected via the preset, wherein the second value of the pressure is less than the target pressure and the first value of the pressure is less than the second value of the pressure.

At least one aspect is directed to a method. The method can be performed by a data processing system comprising one or more processors coupled with memory. The method can include the data processing system establishing a bi-directional connection with a controller of an air compressor of a vehicle. The method can include the data processing system presenting, via a graphical user interface displayed on a display device, an icon for a preset configured with a target pressure for a type of object. The method can include the data processing system transmitting, via the bi-directional connection responsive to a selection of the preset, an instruction to the controller to activate the air compressor to inflate the type of object to the target pressure.

At least one aspect is directed to a vehicle. The vehicle can include an air compressor. The air compressor can be located within an enclosure of the vehicle. The vehicle can include a controller configured to activate the air compressor. The vehicle can include a display device located within a cabin of the vehicle. The vehicle can include one or more processors coupled with memory. The one or more processors can establish a bi-directional connection with the controller. The one or more processors can present, via a graphical user interface displayed on the display device, an icon for a preset configured with a target pressure for a type of object. The one or more processors can transmit, via the bi-directional connection responsive to a selection of the preset, an instruction to the controller to activate the air compressor to inflate the type of object to the target pressure.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
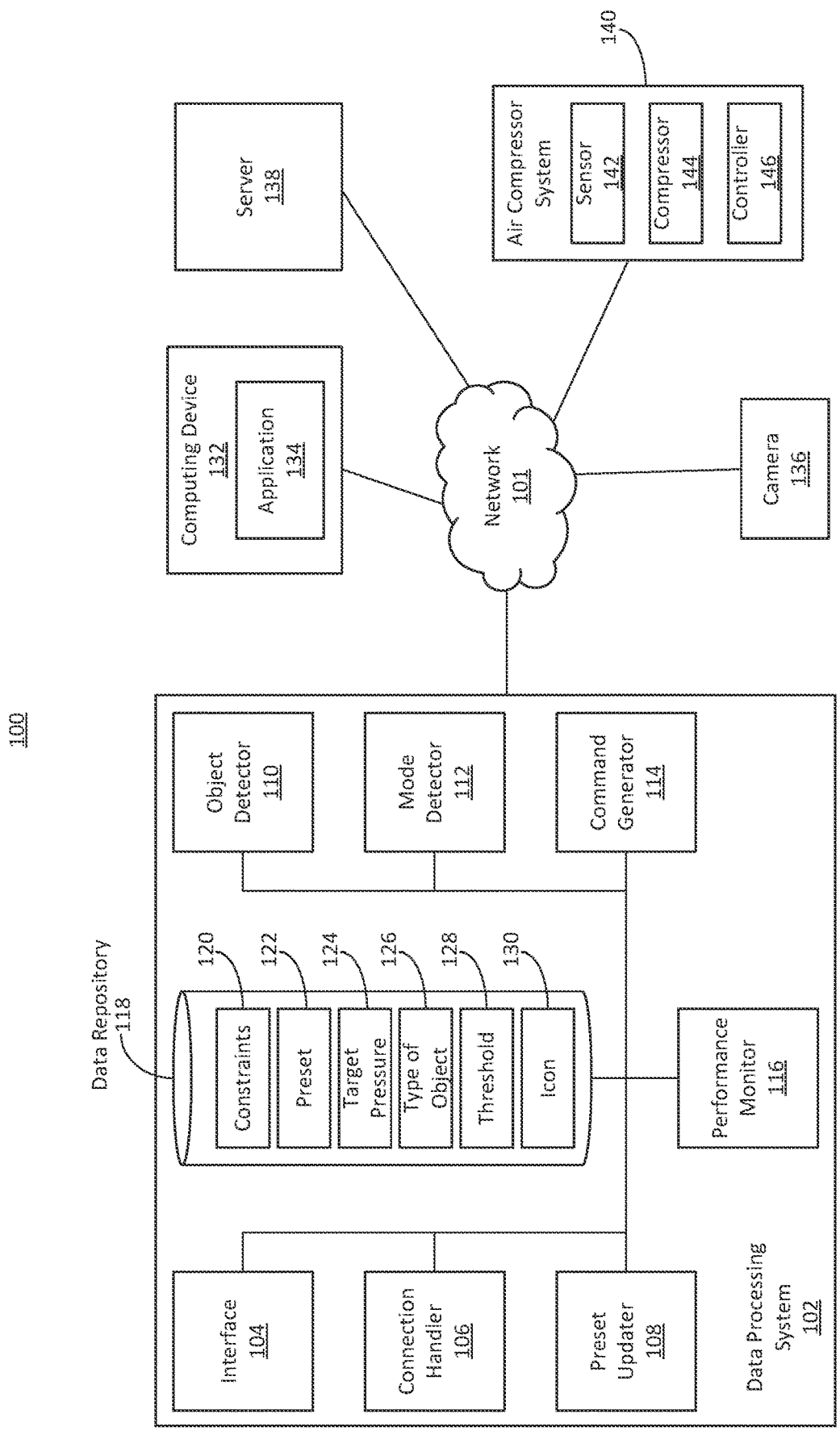
FIG. 1 depicts an example system for controlling an air compressor.

Following below are more detailed descriptions of various concepts related to, and implementations of, methods, apparatuses, and systems of controlling an air compressor. The various concepts introduced above and discussed in greater detail below may be implemented in any of numerous ways.

This disclosure is generally directed to controlling an air compressor. For example, this technical solution can provide a touchscreen or other interface in a vehicle that is designed, constructed and operational to control an air compressor that is integrated or otherwise a part of the vehicle. This technology can provide a touchscreen interface with buttons, widgets, shortcuts or other user interface elements that provide pressure targets based on the type of object the air compressor is to fill with air. For example, the touchscreen interface can provide a differentiation between a target setting mode and a free flowing air mode, provide a real-time indication of progress using an interactive status bar (e.g., pressure checks and animation), and save the last known and custom pressure settings to facilitate filling multiple objects with air.

By doing so, this technology can provide improved feedback, increase the speed of selection and interaction with an air compressor mode, and provide for improved customization of air compressor preset targets. Further, by configuring the vehicle touchscreen to control the air compressor, this technology can provide improved usability, understandability and comfort to the user (e.g., by allowing the user to sit inside the vehicle when the outside environment may be harsh). Thus, the interface of this technical solution can result in more efficient inflation by the air compressor that can reduce unnecessary or wasted battery consumption or compressor utilization, while improving the reliability and accuracy with which objects are inflated, thereby improving the longevity or performance of the object.

In an illustrative example, the vehicle can include an air compressor and an interface or controller to control the air compressor. The air compressor can be controlled via a bi-directional connection to a data processing system of the vehicle. The data processing system can display to a user a graphical user interface for interacting with the air compressor. The graphical user interface (GUI) can display an icon of an object to inflate. For example, the GUI can display icons of a volleyball, an air mattress, or a bicycle. The GUI can have preset icons with preset target pressure stored in the data processing system. For example, the GUI can display a bicycle with a target pressure of 90 psi. The GUI can also have user input icons with user input target pressures. For example, the user can select from a listing of icons and assign a name and target pressure to this customized icon. The air compressor can inflate the object to the target pressure. The air compressor can communicate with the data processing system via a bi-directional connection for control of the air compressor. The data processing system can present, via the GUI, a progress bar for indicating inflation level of the object. The GUI can also display messages to the user regarding the inflation. For example, the GUI could display a message stating that the air compressor needs a moment to cool down before continuing inflation.

The air compressor controller can be bi-directionally coupled or connected (e.g., via Bluetooth, hardwired, other communication methods) to the data processing system of the vehicle. The data processing system can include a GUI for display and accepting user inputs. Advantageously, the GUI can accept user inputs related to a specific target pressure for an inflation object. Furthermore, the GUI can display warning or other messages to the user related to the inflation process.

FIG. 1 depicts an example system 100 to control an air compressor. The system can include a data processing system 102. The data processing system 102 can include an interface 104. The data processing system 102 can include a connection handler 106. The data processing system 102 can include a preset updater 108. The data processing system 102 can include an object detector 110. The data processing system 102 can include a mode detector 112. The data processing system 102 can include a command generator 114. The data processing system 102 can include a performance monitor 116. The data processing system 102 can include a data repository 118. The data processing system 102 can bi-directionally communicate with one or more of a computing device 132, a server 138, an air compressor system 140, or a camera 136 through the network 101. The bi-directional communication can send or receive information to any of the components of the system.

The interface 104, connection handler 106, preset updater 108, object detector 110, mode detector 112, command generator 114, or performance monitor 116 can each include at least one processing unit or other logic device such as a programmable logic array engine, or module configured to communicate with the data repository 118. The interface 104, connection handler 106, preset updater 108, object detector 110, mode detector 112, command generator 114, or performance monitor 116 can be separate components, a single component, or part of the data processing system 102. The system 100 and its components, such as data processing system 102, can include hardware elements, such as one or more processors, logic devices, or circuits. The data processing system 102 can include at least one computation resource, server, processor or memory. For example, the data processing system 102 can include a plurality of computation resources or processors.

The network 101 can include any kind of communications link, cables, transmitters, receivers, transceiver, logic circuit, communication chip, communication network (e.g. a local area network ("LAN"), a wide area network ("WAN"), or an inter-network (the internet)), configured to allow or facilitate communication, transmission, reception, or connection with the components of the system and with outside systems. Network 101 can enable communication with the data processing system 102 and an air compressor system of the vehicle, a camera of the vehicle, or other components of the vehicle. Network 101 can facilitate the establishment of a bi-directional connection via the connection handler 106.

The data processing system 102 can store, transmit, receive, or display information that can facilitate controlling an air compressor. The data processing system 102 can, for example, store data about the system in data repository 118. The data processing system 102, can, for example, transmit information received through interface 104 through the connection handler 106. The data processing system 102 can include, interface with, access, or otherwise communicate with or through a network of subcomponents (e.g., interface 104, connection handler 106, or preset updater 108) which can communicate with each other.

Data repository 118 can include any information about the system 100 and can communicate that information via the connection handler 106. Data repository 118 can include constraints 120, a preset 122, the target pressure 124, the type of object 126, a threshold 128, or icon 130. The information contained in data repository 118 can change periodically, via an input from a user, or via an update to the system, for example. Information in data repository 118 can be stored in any kind of memory, such as a cloud or hard drive for example.

Data repository 118 can contain constraints 120. Constraints 120 can be any combination of limitations, restraints, or checks on the system. For example, constraints 120 can be an upper inflation limitation. Constraints 120 can be a maximum heat of an air compressor. Constraints can be related to a mode of operation of the vehicle. For example, constraints 120 may refer to a disablement of features during vehicle operation. For example, if the vehicle is operating, constraints 120 may disable functionalities of the vehicle.

Data repository 118 can include presets 122. Presets 122 can include any user input or system derived configuration for inflation of an object. For example, preset 122 can include a user customized object for inflation. For example, preset 122 can be a button or icon for a volleyball, containing information about the desired pressure for the volleyball.

Preset 122 can be updated or changed by preset updater 108. The presets 122 can include or be linked or associated with a target pressure 124. The presets 122 can include or be linked with an air flow rate or air velocity rate. The presets 122 can include or be linked with a desired or maximum duration of inflation.

Preset updater 108 can be any configuration for changing, modifying, creating, deleting, or editing presets 122. Preset updater 108 can change any aspect of a preset, such as a target pressure or an icon shape. Preset updater 108 can be employed by the one or more processors and can be utilized by the system or the user. For example, a user can use preset updater 108 to change a target pressure of a bicycle from 80 psi to 90 psi.

Target pressure 124 can be a desired inflation, pressure, or air volume. Target pressure 124 can refer to or include a maximum pressure to which to inflate an object or type of object. Target pressure 124 can be stored in preset 122, data repository 118, or in another part of data processing system 102. Target pressure 124 can be calculated, taken from a look up table, or input by a user. Target pressure 124 can be measured in pressure, such as in units of pounds per square inch (psi), Pascales (Pa), or atmospheres (atm). Target pressure 124 can be updated by preset updater 108. Target pressure 124 can be predetermined by a type of object. The target pressure 124 can include or be linked with a desired air flow rate or air velocity rate. The target pressure 124 can include or be linked with a desired or maximum duration of inflation.

Type of object 126 can be a database of a plurality of inflatable objects. Inflatable objects can include, for example, a ball, a tire, or an air mattresses. The type of object can be more granular, such as a type of ball (e.g., ball for basketball, ball for volleyball, soccer ball, or a ball for football), or a type of tire (e.g., tire for the vehicle 405, tire for a mountain bike, tire for a road bike, tire for an all-terrain vehicle). The type of object 126 can be correlated to target pressure 124 and constraints 120 and contained within data repository 118. For example, type of object 126 may be a bicycle with a target pressure of 90 psi and a constraint of 110 psi. Type of object may include other information pertaining to the object, such as volume of air, material of object, or another quality of the inflatable object. Type of object can be updated in the preset updater 108. The types of objects can be updated by the user or by the vehicle system. The data processing system 102 can identify a type of object with an object detector and can assign attributes to the detected object based upon its identified type of object.

A threshold 128 can be contained within data repository 118 for making comparisons within the system. The threshold can relate to one or a plurality of pressure thresholds, time thresholds, or some other value of threshold. The system can refer to the threshold 128 for making decisions via a performance monitor, mode detector, or other controller.

Data repository 118 can one or more icons 130. Icon 130 can be any image, graphic, logo, picture, or avatar which correspond to a type of object 126. The icon 130 can be displayed by the interface 104. The icon 130 can be an image of a volleyball, bicycle, vehicle, air mattress, or other inflatable object to make identifiable to the user the type of object. The icon 130 can be selectable by the user via interface 104, preset updater 108, or other component of data processing system 102, for example.

The preset updater 108 can add new presets or update existing presets. For example, the preset updater 108 can receive, via the graphical user interface (e.g., interface 104), a request to add a second preset 122. The data processing system 102 can receive, via the graphical user interface, an indication of a second type of object 126 for the second preset 122 that is different from a first type of object that is already configured as a preset. The preset updater 108 can provide, via the graphical user interface, a range of target pressures 124 selected based on the second type of object 126. The preset updater 108 can receive, via the graphical user interface (e.g., interface 104), a selection of a second target pressure within the range of target pressures (e.g., via preset updater 108). The preset updater 108 can establish (e.g., via preset updater 108) the second preset configured with the second target pressure for the second type of object. For example, the user can select to add a volleyball to the list of presets via preset updater 108. The user can select to add a new preset, select (for example) "volleyball" from the list of preconfigured presets, and then select a target pressure for the new preset from a range of target pressures predetermined for volleyballs.

The data processing system 102 can include, access, or otherwise utilize an interface 104. The interface 104 can be any of a display device with buttons, touchscreen device, or other device configured to both display and accept inputs. Interface 104 can be located within the vehicle. Interface 104 can be located, for example, within the dashboard of the vehicle. Interface 104 can accept user inputs which can be stored within the data repository 118 or transmitted to the network 101 or to any of the subcomponents of data processing system 102. For example, a user could make a selection through a touchscreen device of interface 104, responsive to a display on the interface 104. Interface 104 can include a direct touchscreen device for user inputs, or can include a cursor control, such as a mouse, trackball, or keyboard for accepting such inputs. Interface 104 can display information about the system. For example, interface 104 can display a progress bar indicating the current pressure of the object being inflated relative to a desired target pressure 124. For example, interface 104 can display an icon 130 corresponding to a type of object 126 for inflation. Inputs from interface 104 can be stored in data repository 118.

The data processing system 102 can include a connection handler 106 designed, constructed and operational to facilitate the bi-directional communication between the data processing system 102 and the air compressor system 140. The connection handler 106 can establish a bi-directional communication channel between the data processing system 102 (or one or more component thereof) and the air compressor system 140 (or one or more component thereof, such as the controller 146). The bi-directional connection can refer to any connection, communication, or coupling that is configured to or capable of transmitting and receiving data. The connection handler 106 can establish the bi-directional connection via a network, a hardwired line, Bluetooth, or by other means known to those in the art. The bi-directional connection can be wireless. For example, the bi-directional connection can be based on a short-range wireless interconnection protocol (e.g., Bluetooth), a control area network (CAN), 4G or 5G.

To establish the bi-directional connection with a controller 146 of the air compressor system 140 of a vehicle, the connection handler 106 can perform a handshaking process. The connection handler 106 can perform a handshake process with the controller 146 pursuant to or in accordance with a wireless communication protocol. For example, the connection handler 106 can broadcast a signal or inquiry. The controller 146 can detect the signal or inquiry, and send a response that includes an identifier or address of the controller 146. The connection handler 106 can determine that the identifier or address of the controller matches an address or identifier stored in the data repository 118. If the connection handler 106 determines that the controller 146 is a previously authorized controller 146 or has been configured for communication with the data processing system 102, then the connection handler 106 can automatically proceed to establish the bi-directional connection with the controller 146. In some cases, the connection handler 106 can display information via the interface 104 indicating the identifier or address of the controller 146, and provide a prompt with a request to authorize a connection with the identified controller 146. The user can authorize or accept the connection request.

The connection handler 106 can enter a paging process in which the bi-directional connection between the controller 146 and the connection handler 106 can be established. Once the paging process is complete, the bi-directional connection can enter an active connection state, in which the data processing system 102 or controller 146 can actively participate in transmitting or receiving data.

The connection handler 106 can automatically establish the bi-directional connection with the controller 146 responsive to an indication or instruction from a user to control the air compressor system 140. In some cases, the connection handler 106 can maintain the connection in a power-saving mode, such as a sniff mode (e.g., a power-saving mode where the controller 146 is less active and the connection handler 106 or controller 146 sleeps and listens for transmission at a set time interval, such as every 100 milliseconds), a hold mode (e.g., a temporary, power-saving mode where the controller 146 or connection handler 106 sleeps for a defined period of time and then returns back to active mode when that interval has passed), a park mode (e.g., a deeper sleep mode in which the connection handler 106 can command the controller 146 to become inactive until the connection handler 146 instructs the controller 146 to wake up).

In the event the bi-directional connection between the connection handler 106 and the controller 146 is terminated or lost, the connection handler 106 can reestablish the connection. For example, the connection handler 106 can repeat some or all of the steps in the handshake process. The connection handler 106 can display, via interface 104, information regarding a connection or communication session with the air compressor system 140. The connection handler 106 can provide, via interface 104, options regarding the connection, status information, alerts, or errors with the connection.

The data processing system 102 can include an object detector 110 can be designed, constructed and operational to analyze or identify a potential inflatable object. Object detector 110 can communicate with or be coupled with a camera 136. Object detector 110 can receive, from the camera 136, an image, video, or other data of a potential inflatable object. The object detector 110 can process and compare the received data with object information (e.g., type of object 126) stored in data repository 118 to identify a similar or matching type of object. Object detector 110 can find a match according to type of object 126, preset 122, or any other stored information about objects. For example, object detector 110 can detect an object and compare the object to a database of objects using image recognition technology. For example, object detector 110 can analyze the current pressure of the potential inflatable object and try to recognize the type of object according to deflated pressures of recognized objects.

The object detector 110 can include, interface with, or otherwise receive data from any type of sensors, cameras, timers, machine learning models, or scopes to identify an object. For example, object detector can detect a type of valve to which an air compressor of the vehicle is attached in order to make a determination as to the type of object. Object detector 110 can detect a multiple potential inflatable objects and use user input or other system knowledge to make a determination between the one or more potentially inflatable objects. Object detector 110 can communicate with interface 104 to provide display options for the user. For example, object detector may detect a bicycle for inflation, but may present both a mountain bike and a road bike, and the user makes the selection for the desired object.

In an illustrative example, the object detector 110 can use a camera 136 to take a picture of a volleyball. The object detector 110 can perform an image recognition or detection technique on the image of the volleyball to determine that the image contains a volleyball. The object detector 110 can provide an indication of the detected volleyball to one or more other component of the data processing system 102 to facilitate controlling the air compressor, such as by configuring presets, target pressures, or thresholds for the identified volleyball.

The object detector 110 can receive, from a camera 136 of the vehicle, an image of an object. The data processing system 102 can determine (via object detector 110), based on the image, the object corresponds to the type of object 126. The data processing system 102 can provide, responsive to the determination that the object corresponds to the type of object 126, the icon 130 for the preset 122 for presentation via the graphical user interface (e.g., interface 104). For example, the camera 136 can take an image of the object to be inflated. The object detector 110 can determine from this image which preset 122 the object corresponds with, and can give an instruction to the interface 104 to display the corresponding icon 130 for the determined type of object 126.

The data processing system 102 can include a mode detector 112 designed, constructed and operational to determine a mode of operation of the air compressor system 140. The modes of operation can include, for example, a free flowing air mode or target pressure mode. In the free flowing air mode, the air compressor system 140 can supply or deliver air irrespective of any target pressure. For example, in the free flowing air mode, there may not be a target pressure 124. In the free flowing air mode, there may not be an object to inflate coupled to the air compressor system 140. For example, in the free flowing air mode, the air compressor system 140 can provide air flow until the user determines to stop the air flow, or until a maximum duration of operation has been reached, or until the temperature of the compressor 144 exceeds a temperature threshold 128.

In the target pressure mode, the data processing system 102 can cause the air compressor system 140 to inflate an object that is coupled to the air compressor system until the desired target pressure 124 has been reached. In the target pressure mode, the data processing system 102 can coordinate with the air compressor system 140 to inflate the object until the target pressure 124 is reached, and then stop or terminate supply or delivering air into the object.

The mode detector 112 can provide, via interface 104, available modes for the user to select. A selection of the mode by the user, or automatically by the mode detector 112, can cause the data processing system 102 to generate and send an instruction via the command generator 114 to the air compressor system 140 in accordance with the selected mode.

For example, the mode detector 112 can present, via the graphical user interface (e.g., interface 104), one or more icons corresponding to the available modes. A first icon can correspond to a target pressure mode for an object coupled to the air compressor 144, and a second icon can correspond to a free flowing air mode without any target pressure 124. For example, a user can connect a basketball to the air compressor system 140 and select a target pressure mode in which the air compressor system inflates the basketball to the desired target pressure. In another example, the user can connect the basketball to the compressor 144 and choose to operate the compressor 144 without inputting a target pressure 124 into the interface 104. The mode detector 112 can, in an example, detect a connection to an inflatable object and provide the option via the interface 104 for a free flowing air mode or a target pressure mode.

The mode detector 112 can automatically select a mode. For example, the data processing system 102 can determine that no object is connected to the air compressor system 140. Responsive to determining that no object is connected or coupled to the air compressor system 140, the mode detector 112 can automatically select or suggest entering the free flowing air mode.

In some cases, the mode detector 112 can determine the mode of operation of the air compressor system 140 based on a type of activity the vehicle is performing or a scenario or environment in which the vehicle is operating. For example, vehicle operation can include on-roading, off-roading, comfort mode, or sport mode. Vehicle activity can include, for example, camping, biking, water activities, construction work, or hiking.

The data processing system 102 can receive an indication that the vehicle is in an off-road mode, via the mode detector 112 or interface 104. The data processing system 102 can select, for presentation via the graphical user interface (e.g., interface 104), the preset 122 with the target pressure 124 based on the off-road mode of the vehicle. For example, mode detector 112 can determine that the vehicle is operating in an off-road mode and can recommend to the user via the interface 104, a potentially more suitable target inflation pressure for the tires of the vehicle. An off-road mode can include where the vehicle is mudding, driving on slick or rugged surfaces, or driving on compressible surfaces such as soft earth or sand.

The mode detector 112 can automatically detect a characteristic of the vehicle and provide a preset 122 based on the characteristic, activity or type of operation. Mode detector 112 can, for example, determine that the vehicle is operating off-road and can provide for the user, via the interface 104, a preset 122 for operation in the off-road mode.

To do so, the mode detector 112 can determine a location of the vehicle and compare the location with a map that can indicate types of activities performed at the location, such as camping, biking or hiking. In another example, the mode detector 112 can include information about historical modes the vehicle was in when in a particular location. For example, the user of the vehicle can indicate a mode at a particular location, and the mode detector 112 can store that mode and retrieve the indicated mode upon returning to the location.

The data processing system 102 can include a command generator 114 designed, construction and operational to send one or more commands or instructions to the air compressor system 140 (e.g., controller 146) that can facilitate controlling the air compressor 144. The command generator 114 can provide or communicate the commands via the bi-directional connection established by the connection handler 106. The command generator 114 can communicate via the bi-directional with the air compressor 144 of the vehicle to initiate, halt, activate, or otherwise prompt the air compressor to inflate an object.

For example, the command generator 114 can receive, via the interface 104, a selection by the user which indicates inflation to 100 psi. The command generator 114 can then provide an instruction to the air compressor 144 to begin inflation of the object to the desired pressure. Upon an indication from the performance monitor 116, the command generator 114 can then provide the instruction to the air compressor 144 of the vehicle to stop, pause, or cease inflation.

The data processing system 102 can include a performance monitor 116 designed, constructed and operational to determine the status or performance of inflating an object. The performance monitor 116 can determine the real-time status of inflating an object. The performance monitor 116 can determine the current state of the air compressor system 140. The performance monitor 116 can monitor the pressure of an object being inflated. Performance monitor 116 can receive data from an air compressor of the vehicle and make determinations from that information. Performance monitor 116 can, for example, monitor the current pressure of an object being inflated. Performance monitor can communicate with the subcomponents of the system 100. Performance monitor can monitor the system in reference to the threshold 128. For example, performance monitor 116 can recognize the object being inflated is approaching its threshold pressure. Performance monitor 116 can communicate the current inflation to the interface 104. Performance monitor 116 can, for example, communicate the current pressure of a tire being inflated to the interface 104 and present a progress monitoring bar for the current status of inflation. Performance monitor 116, can, as an example, present a notification when inflation is complete. Performance monitor 116 can monitor temperature of a vehicle air compressor. Performance monitor 116 can, for example, recognize when a temperature of a vehicle air compressor is above the threshold 128 amount. Performance monitor 116 can, in an example, provide a warning to the user via the interface 104 that the air compressor is overheated and is to cool down.

To detect the pressure of the object, the performance monitor 116 can instruct the air compressor system 140 to stop or pause inflating the object. The performance monitor 116 can then instruct the sensor 142 to measure, sense, detect, or otherwise identify the pressure of the object. The performance monitor 116 can receive data from the air compressor system 140 (e.g., via the sensor 142 or controller 146) regarding the measured pressure of the object. Upon receiving the pressure data from the air compressor system 140, the data processing system 102 can instruct the air compressor system 140 to continue inflating the object. For example, if the measured pressure of the object is less than the target pressure 124 for the type of object 126, then the data processing system 102 can cause or instruct the air compressor system 140 to continue inflating the object.

The data processing system 102 can receive (e.g., via performance monitor 116), from the controller 146 prior to activation of the air compressor 144, a first value of a pressure (e.g., via sensors 142) measured for an object coupled to the air compressor 144. For example, performance monitor 116 can receive information from controller 146 from the sensors 142 relating to the uninflated pressure of the connected object to inflate. The data processing system 102 can receive, from the controller 146 subsequent to transmission of the instruction and activation (via command generator 114) of the air compressor 144, a second value of a pressure (e.g., via sensors 142) measured for an object coupled to the air compressor 144. For example, command generator 114 can send an instruction to the controller 146 to inflate the object to a target pressure 124 and can then receive pressure information from the controller 146 and sensors 142 relating to the current pressure of the inflating object. The data processing system 102 can provide, via the graphical user interface (e.g., interface 104), a progress bar that indicates the first value of the pressure, the second value of the pressure, and the target pressure 124 selected via the preset 122. The second value of the pressure can be less than the target pressure 122 and the first value of the pressure is less than the second value of the pressure. For example, the first value of pressure can be the pressure when the object is first connected for inflation, the second value of pressure can be the current inflating pressure, and the progress bar can display the current inflation in relation to the first connection inflation and the target inflation.

The data processing system 102 can receive, from the controller 146 subsequent to transmission of the instruction and activation (via command generator 114) of the air compressor 144, a value of a pressure (e.g., via sensors 142) measured for an object coupled to the air compressor 144. The data processing system 102 can determine the value of the pressure is greater than or equal to a threshold 128 (e.g., via performance monitor 116). The data processing system 102 can present, via the graphical user interface (e.g., interface 104), a notification that indicates the air compressor 144 is deactivated responsive to the value of the pressure greater than or equal to the threshold 128. For example, the system can determine that a bicycle connected to the air compressor 144 has reached or exceeded full inflation threshold 128, and the performance monitor 116 can display on the interface 104 a message stating that inflation is complete.

The performance monitor 116 can receive a value of a pressure measured for an object coupled to the air compressor 144 by the sensor 142. The performance monitor 116 can compare the value of the pressure with the target pressure 124 established for the object. If the performance monitor 116 determines that the value of the pressure is equal to the target pressure 124 or substantially equal to the target pressure 124 (e.g., plus or minus 1%, 2%, 3%, 4%, or 5%), then the performance monitor 116 can determine that the current status of inflating the object is 100% or complete. If the value of the pressure is less than the target pressure 124, then the performance monitor 116 can determine that the current status of inflating the object is incomplete. The performance monitor 116 can determine the percent completeness of inflating the object. For example, the performance monitor 116 can determine the difference between the initial value of the pressure of the object before the air compressor 144 began inflating the object, and the current value of the pressure. The percentage completeness can be based on this difference divided by the target pressure as follows: ((target_pressure−current_pressure)/target_pressure)*100.

If the current pressure is less than the target pressure, and the mode is target pressure mode, the performance monitor 116 can allow the air compressor 144 to continue inflating the object. However, the performance monitor 116 can determine to deactivate, terminate, or pause the air compressor 144 if the current pressure is less than the target pressure under certain conditions. For example, if the temperature of the air compressor 144 is greater than or equal to a threshold temperature, the performance monitor 116 can instruct the compressor 144 to pause inflating the object until the temperature drops below the temperature threshold. The performance monitor 116 can pause inflation for a predetermined time interval (e.g., 15 seconds, 30 seconds, 60 seconds, 1 minute, 2 minutes, or 3 minutes), and then instruct (e.g., via command generator 114) the air compressor 144 to resume inflating the object until the target pressure is reached. The performance monitor 116 can pause inflation until the temperature of the air compressor 144 falls below the temperature threshold or a second temperature threshold that is less than the temperature threshold that resulted in pausing the air compressor 144.

The data processing system 102 can receive, from the controller 146, an indication of a value of a temperature (e.g., via sensors 142) measured for the air compressor 144. The data processing system 102 can determine the value of the temperature is greater than or equal to a threshold 128. The data processing system 102 can present, via the graphical user interface (e.g., interface 104), a notification (via performance monitor 116) that indicates the air compressor is deactivated responsive to the value of the temperature greater than or equal to the threshold 128. For example, controller 146 can send an indication that the air compressor system 140 is overheating, and performance monitor 116 can provide a message to interface 104 to alert the user that the air compressor system 140 is taking a break until its temperature has decreased.

In another example, the performance monitor 116 can pause the air compressor 144 if air compressor 144 is continuously inflating the object for a duration that is greater than or equal to a duration threshold. The performance monitor 116 can pause the air compressor 144 for a predetermined pause interval (e.g., 15 seconds, 30 seconds, 60 seconds, 1 minute, 2 minutes, or 3 minutes). In some cases, if the overall duration of the inflation session is greater than or equal to a duration threshold, then the performance monitor 116 can terminate the inflation session or provide a prompt, alert, or notification via interface 104 to request an input as to whether to continue with inflating the object. The overall duration of the inflation session can include one or more pauses due to temperature, for example. The overall duration threshold can be, for example, 1 hour, 2 hours, 3 hours, 4 hours, 5 hours, 6 hours, 12 hours, or 24 hours, for example. The duration threshold can be based on the type of object. For example, a first duration threshold for a basketball can be less than a second duration for an air mattress.

The performance monitor 116 can dynamically determine the duration threshold. For example, the data processing system can determine how long it will take the air compressor 144 to reach the target pressure 124 based on the initial value of the pressure prior to inflation, the target pressure value, and the type of object. For example, if the difference between the target pressure and the initial pressure is 5 psi, and the type of object is a basketball, the performance monitor 116 can set a duration threshold of 1 minute. If, for example, the difference between the target pressure and the initial pressure is 5 psi, and the type of object is an air mattress, the performance monitor 116 can set the duration threshold to 10 minutes.

The data processing system 102 can transmit a second instruction (e.g., via command generator 114) to the controller 146 to deactivate the air compressor 144 responsive to the duration of activity greater than or equal to the threshold 128 and the pressure less than the target pressure 124. The data processing system 102 can provide, via the graphical user interface (e.g., interface 104), a notification that indicates the deactivation of the air compressor 144 responsive to the duration of activity greater than or equal to the threshold 128 and the pressure less than the target pressure 124. For example, the performance monitor 116 can recognize that the amount of time the air compressor 144 would be active in order to reach the target pressure would exceed a threshold time 128, and then send a message to display on the interface 104 to indicate to the user that the air compressor 144 is going to be instructed to pause before continuing inflation.

The data processing system 102 can communicate, interact or otherwise interface with a computing device 132. The computing device 132 can refer to or include a mobile computing device (e.g., a smartphone, smartwatch, wearable device, laptop, or tablet). The computing device 132 can refer to or include a desktop computing device. The computing device 132 can include one or more system or component depicted in FIG. 15.

The computing device 132 can be different from or remote from the data processing system 102. The data processing system 102 can communicate with the computing device 132 via an interface 104 over network 101, for example. The computing device 132 can include or execute an application 134. The application 134 can interface or communicate with one or more component of the data processing system 102. The data processing system 102 can communicate or interface with the application 134 to output information via the computing device 132, or receive information from the computing device 132. For example, the application 134 can add, update, modify, or delete one or more constraints 120, presets 122, target pressures 124, types of objects 126, thresholds 128 or icons 130 stored in the data repository 118.

Application 134 can be executed by the computing device 132 to provide an interactive display to the interface 104. Application 134 can be updated periodically, or by user choice, or automatically. Application 134 can include a display, an interactive component, or a graphical user interface (GUI). Application 134 can access any of the information stored in data processing system 102 and can display any such information.

One or more system or component depicted in FIG. 1 can interface or communicate with the server 138. For example, the server 138 can provide one or more function or otherwise facilitate controlling the air compressor system 140. The server 138 can include one or many of, for example, a database, an application manager, communications, or a computer. The server 138 can be configured to perform function for the network 101, the computing device 132, or the data processing system 102, for example. For example, the computing device 132 can interface with the server 138 to download the application 134. The computing device 132, via application 134, can communicate with the data processing system 102 of the vehicle via the server 138. For example, the application 134 executing on the computing device 132 can transmit data to the server 138, and the server 138 can transmit at least a portion of the data received from the computing device 132 to the data processing system 102.

The system 100 can include, interface with or otherwise utilize a camera 136. For example, the object detector 110 can communicate with the camera 136 or receive information or data obtained or captured by the camera 136. The camera 136 can be communicatively coupled with the object detector 110. The camera 136 can be one or a plurality of types of cameras such as digital single reflex lens (DSLR), compact, or mirrorless cameras. The camera 136 can be equipped to be protected from the weather. The camera 136 can take images or videos of an object to be inflated and can transmit those images or videos to the object detector 110 for detection. The camera 136 can be located anywhere on the vehicle, such as the hood, the dashboard, or the trunk. The camera 136 can be a camera separate from the vehicle but communicatively coupled to the object detector 110. The camera 136 can, for example, be a camera on a computing device 132 which can capture images that the computing device 132 can transmit to the data processing system 102 for further processing.

The air compressor system 140 can be integrated with or part of the vehicle. The air compressor system 140 can be designed, constructed and operational to inflate objects. The air compressor system 140 can include sensors 142, air compressors 144, and controllers 146. The air compressor system 140 can communicate with data processing system 102 to receive or send information regarding the current inflation of an object. The air compressor system 140 can be activated or deactivated by the data processing system 102. The air compressor system 140 can be activated manually at its location. The air compressor system 140 can be located at the back of the vehicle, such as in a compartment, trunk, or truck bed.

The air compressor system 140 can include one or more sensors 142 which can measure pressure, temperature, or another quality of the air compressor system 140. The one or more sensors 142 can, for example, be pressure sensors which measure the pressure of the object being inflated. Examples of pressure sensors include pressure transducers which provide a change in voltage for changes in pressure, strain gauge which provide a change in resistance for changes in pressure, or piezoelectric pressure sensors which generate a current in response to physical changes in material. The one or more sensors 142 can, for example, be any kind of temperature sensors to measure the heat of the air compressor system 140. Examples of temperature sensors include thermocouples, thermistors, or resistance temperature detectors (RTD). The one or more sensors 142 can, for example, detect that the heat of the air compressor system 140 and relay that temperature information to the data processing system 102 to determine if the air compressor system 140 is above a certain threshold 128.

The air compressor system 140 can include a compressor 144 which can be a pneumatic device to inflate objects such as tires, balls, and air mattresses. The compressor 144 can be contained within the vehicle. The compressor 144 can be powered for example by the batteries of the vehicle, by a dynamo, or by a separate battery of the compressor. The compressor can include a multitude of pins for connection to different valves such as Presta or Schrader. The compressor can be controlled by a controller 146.

The controller 146 can control the activation or deactivation of the compressor 144. The controller 146 can communicate with the data processing system 102, the network 101, the computing device 132, the server 138, or any other component of system 100. For example, the controller 146 can receive a command from the command generator 114 to activate the compressor 144. The controller 146 can provide information to the data processing system 102 via the bi-directional connection. For example, the controller 146 may provide an indication to the performance monitor 116 that the inflation has completed. The controller 146 can include any kind of electronic circuit, chip, logic device, computer, or other such device to enable control.

In some aspects, the present solution can relate to a system 100, which can include a data processing system 102 of a vehicle. The data processing system 102 can include one or more processors coupled with memory to establish a bi-directional connection (e.g. through connection handler 106) with a controller of an air compressor (e.g., controller 146) of the vehicle. The data processing system 102 can present, via a graphical user interface (e.g. interface 104) displayed on a display device, an icon 130 for a preset 122 configured with a target pressure 124 for a type of object 126. For example, an icon of a volleyball can be displayed on the graphical user interface which has associated with it a preset configuration for inflation of a volleyball. The data processing system 102 can transmit, via a bi-directional connection responsive to a selection of the preset 122, an instruction (e.g., by command generator 114) to the controller 146 to activate the air compressor 144 to inflate the type of object to the target pressure 124. For example, selecting the volleyball icon can generate an instruction to be sent to the controller to activate the compressor until it reaches the target volleyball pressure.

The system 100 can include, interface with or otherwise utilize a display device (e.g., interface 104). The display device can be located within a cabin of the vehicle (e.g., vehicle 405 depicted in FIG. 4). For example, a display device can be located in the dashboard, the center console, or elsewhere within the cabin of the vehicle. The display device can include a graphical user interface (GUI), LCD screen, or other such display device.

If, for example, the vehicle 405 includes a truck with a bed, the display device (e.g., interface 104) can be located on the bed of the truck. For example, the display device can be located within a cabinet in the bed of the truck. The display device can be protected or shielded from damage by weather, rain, precipitation, dust, or debris. For example, the display device can be located within or enclosed by a waterproof housing or cabinet.

The computing device 132 can be coupled to the display device. For example, the computing device 132 can be located in the cabin of the vehicle and the display device can be located in the bed of the truck. The computing device 132 and the display device (e.g., interface 104) can be coupled via hard wired connection, LAN, Bluetooth, cabling, or another medium.

Figure 2:
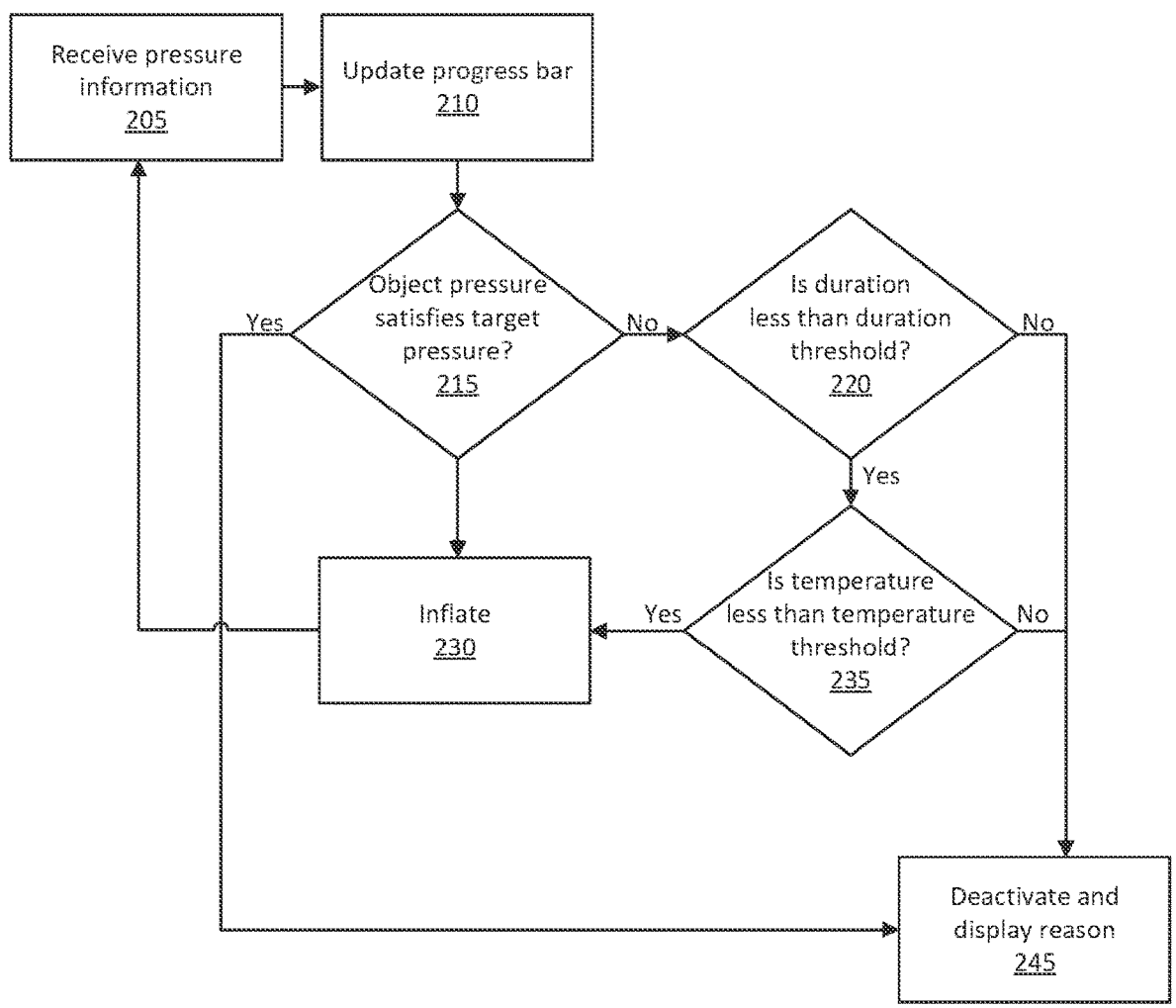
FIG. 2 depicts an example flow chart of a method for controlling an air compressor.

FIG. 2 depicts an example process 200 for controlling an air compressor. The method 200 can be performed by one or more system or component depicted in FIG. 1, FIG. 4, or FIG. 15, including, for example, a data processing system. At ACT 205, the method 200 can include the data processing system receiving pressure information. Receiving pressure information can refer to the one or more sensors 142 sending an initial pressure measurement of the inflatable object to the controller 146. For example, a bicycle tire can be attached to the compressor 144 and the sensor 142 can send an initial pressure measurement of 50 psi to the controller 146. The data processing system can receive the pressure measurement from the controller 146.

Figure 9:
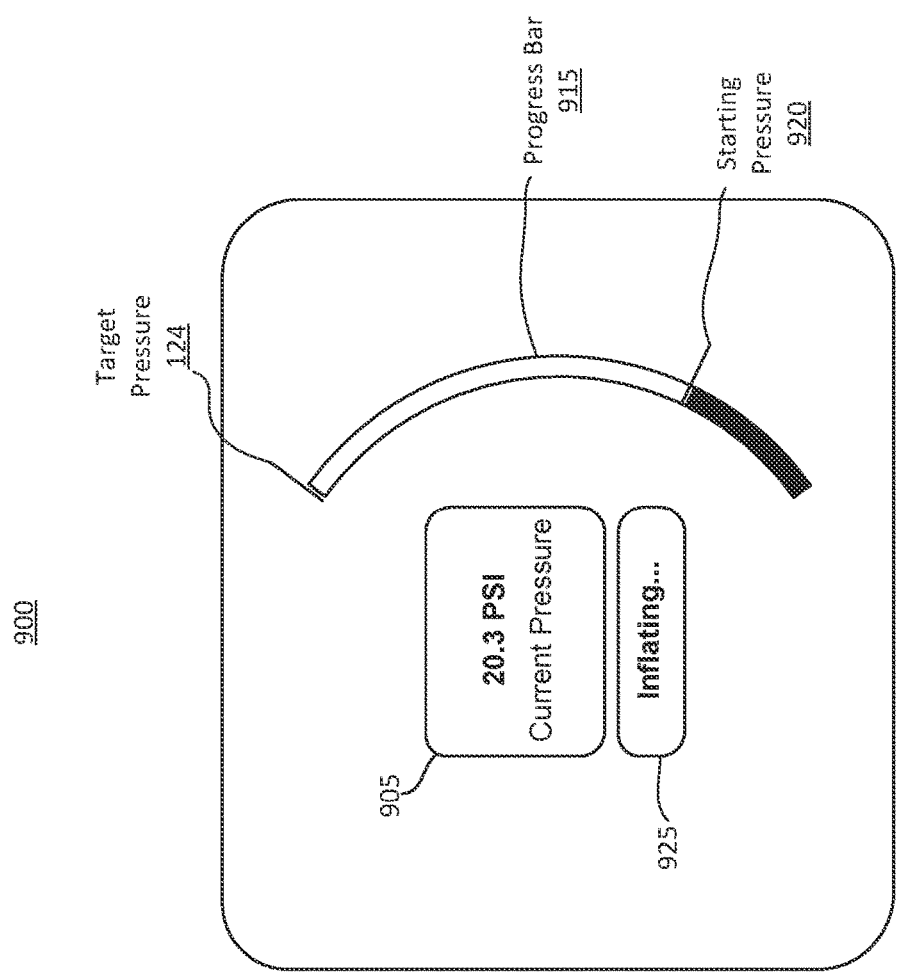
FIG. 9 depicts an example graphical user interface for indicating inflation progress.
Figure 10:
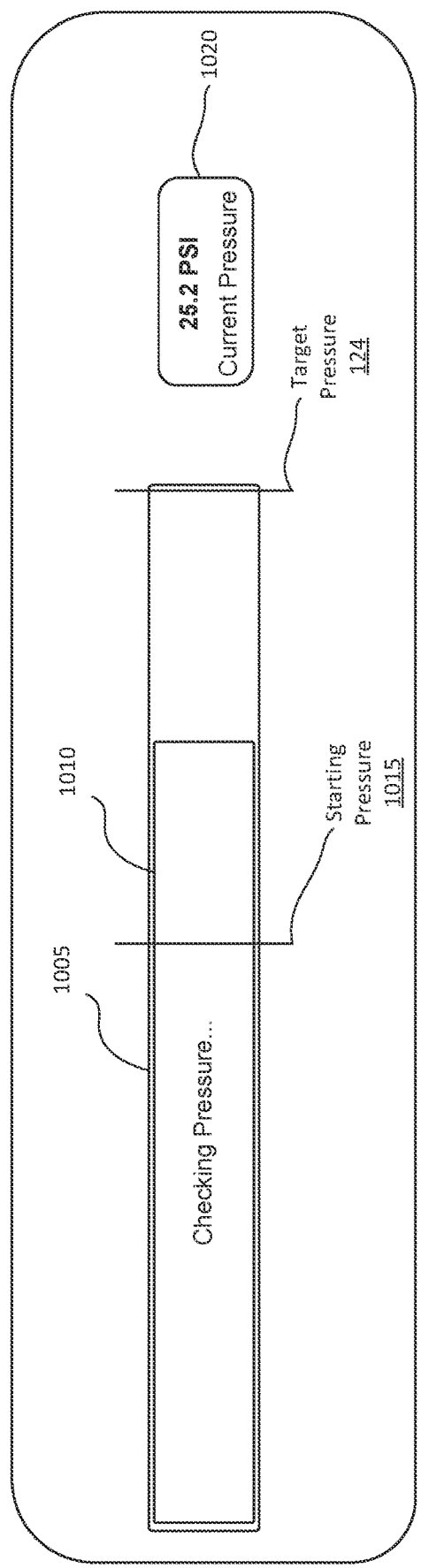
FIG. 10 depicts an example graphical user interface for indicating inflation progress.

At ACT 210, the data processing system can update a progress bar. For example, the data processing system can update a progress bar responsive to receiving the pressure information. An example of a progress bar presented by the data processing system via a graphical user interface is depicted in FIG. 9 and FIG. 10. Updating the progress bar can include altering a display on the interface 104 to indicate to the user the completion status of the inflation. For example, upon initialization the progress bar can be updated to indicate an initial pressure measurement of the inflatable object to be 50 psi via a display on the interface 104.

At decision block 215, the data processing system can determine if the current pressure of the object satisfies the target pressure. For example, the data processing system can compare the target pressure 124 and the current pressure of the inflatable object. The data processing system can determine that the current object pressure does not satisfy the target pressure (e.g., the current pressure is less than the target pressure). For example, the data processing system can determine that the initial pressure 50 psi is less than the target pressure for a bicycle tire of 80 psi. If the current pressure is less than the target pressure, the data processing system can proceed to decision block 220. If, however, the data processing system determines that the current pressure satisfies the target pressure (e.g., the current pressure is greater than or equal to the target pressure), the data processing system can proceed to ACT 245. For example, performance monitor can determine that the current pressure 80 psi satisfies the target pressure for a bicycle tire of 80 psi, and then proceed to ACT 245 to deactivate the air compressor and provide a status update or indication that inflation is complete.

At decision block 220, the data processing system can determine if the duration is less than the duration threshold. The data processing system can determine the duration as a length of time for which the compressor 144 has been inflating the object or performing an inflation session for the object. The duration threshold can be one of the thresholds 128 and can indicate an upper limit of inflation time for the compressor 144 to be inflating the object. In an illustrative example, the duration of inflating the object can meet or exceed the duration threshold if there is a leak in the object that is being inflated or a leak or malfunction in the air compressor system or a pipe or hose that is used to deliver air to the object. In another example, the duration threshold can be met or exceeded if the object is too large. For example, if the bicycle tire has a leak such that the tire cannot hold pressure, the duration would meet or exceed the duration threshold because the compressor 144 would not be able to inflate the tire to the target pressure 124 in any amount of time. If the duration is not less than the duration threshold, the data processing system can proceed to ACT 245 to deactivate the air compressor and provide a notification. If, however, the duration is less than the duration threshold, the data processing system can proceed to decision block 235 to perform a temperature check.

At decision block 235, the data processing system can determine if the temperature of one or more component of the air compressor system (e.g., the air compressor) is less than the temperature threshold. The temperature threshold can be one of the thresholds 128 and can indicate an upper limit of temperature the compressor 144 can withstand. Meeting or exceeding the temperature threshold can happen, for example, if the compressor 144 is operated for too long of a continuous period, or if the compressor 144 is operating in conditions outside its recommended environment. For example, if the bicycle tire is a very large tire for a very large bicycle and being inflated in 100° Fahrenheit ambient conditions, the temperature of the compressor may exceed the temperature threshold. If the temperature is not less than the temperature threshold, the data processing system can proceed to ACT 245 to deactivate the air compressor and provide a notification or alert of the deactivation. If, however, the data processing system determines the temperature is less than the temperature threshold, the data processing system can proceed to ACT 230 to inflate the object or continue inflating the object.

At ACT 230, the data processing system can cause or facilitate inflation of the object. To inflate the object, the data processing system can send a command to activate an air compressor to operate and provide air. The air compressor can provide air to an inflatable object connected to the compressor via one or more valves, hoses or pipes. Activating the compressor can include running a motor of the compressor.

The ACT 230 of inflation can be performed for a predetermined time interval. For example, the data processing system can instruct the air compressor to inflate the object for a predetermined number of seconds or other time interval. The data processing system can cause the air compressor to pause inflation such that the data processing system can determine the current pressure to determine the progress or status of inflating the object. For example, depending on the current status of the inflation session (e.g., 10%, 20%, 30%, 50%, 80%, 70%, 80%, 90%), the data processing system can set a time interval for the inflate ACT 230. If the percent inflation is low or less than 50%, then the time interval can be higher as compared to if the percent inflation is high, such as greater than 80%. The time interval can be based on the type of object such that the greater the volume to be inflated, then the larger the time interval, as compared to a smaller volume to be inflated. The data processing system can return to ACT 205 to determine the status of the inflation. For example, the data processing system can determine after ACT 230 that a bike tire has been inflated from 50 psi to 60 psi.

If, at decision block 215, the data processing system determines that the pressure of the object satisfies the target pressure (e.g., meets or exceeds the target pressure), then the data processing system can proceed to ACT 245 to deactivate the air compressor. Thus, the data processing system can determine to deactivate the air compressor responsive to the object pressure satisfying the target pressure. At ACT 245, the data processing system can provide or display a reason for deactivating the air compressor, such as inflation complete or pressure meets or exceeds the target pressure. ACT 245 can include displaying on interface 104 a notification that the object has met the target pressure. For example, responsive to the command generator 114 sending an indication to the controller 146 to cease operation of the compressor 144, the interface 104 can display a completed progress bar and a notification alerting the user to the completion of inflation.

The data processing system can provide an indication to the controller 146 to deactivate or turn off the compressor 144. For example, the performance monitor 116 may communicate via the bi-directional connection to the command generator 114 an indication to the controller 146 to cease operation of the compressor 144.

If the data processing system proceed to ACT 245 from decision block 220 or decision block 235, the data processing system can deactivate the air compressor and provide a reason for the deactivation that is different from the pressure of the object satisfying the target pressure. For example, if the data processing system determined at decision block 220 that the duration of the inflation session exceeds the duration threshold, then the data processing system can proceed to ACT 245 to deactivate the air compressor and display a notification or indication that the duration threshold has been reached. The data processing system can indicate possible reasons the duration threshold has been exceeded, such as the possible presence of a leak in the object or a pipe or hose used to inflate the object. If the data processing system determined at decision block 235 that the temperature meets or exceeds the temperature threshold, the data processing system can proceed to ACT 245 to deactivate the air compressor and provide an indication that the temperature of the air compressor has met or exceeded the temperature threshold.

The data processing system can, in some cases, pause the inflation session and then automatically resume the inflation session. For example, if the inflation session is paused due to the temperature of the air compressor exceeding a temperature threshold, then the data processing system can resume inflation after the temperature drops below a lower temperature threshold or after a predetermined amount of time has passed.

Figure 3:
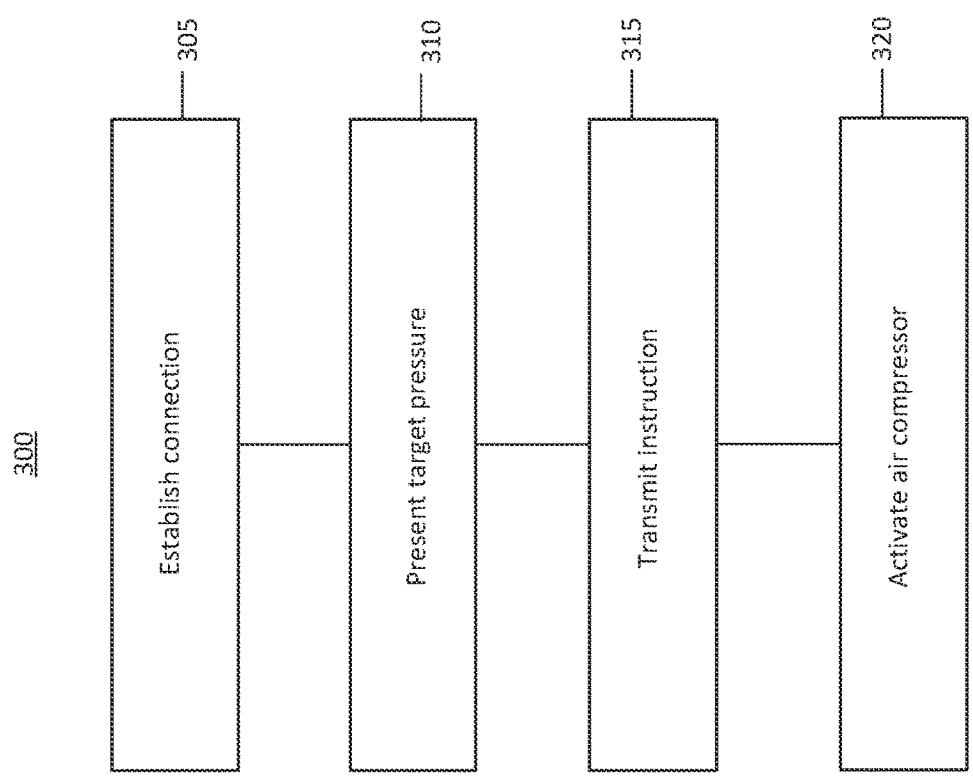
FIG. 3 depicts a method for controller an air compressor.
Figure 4:
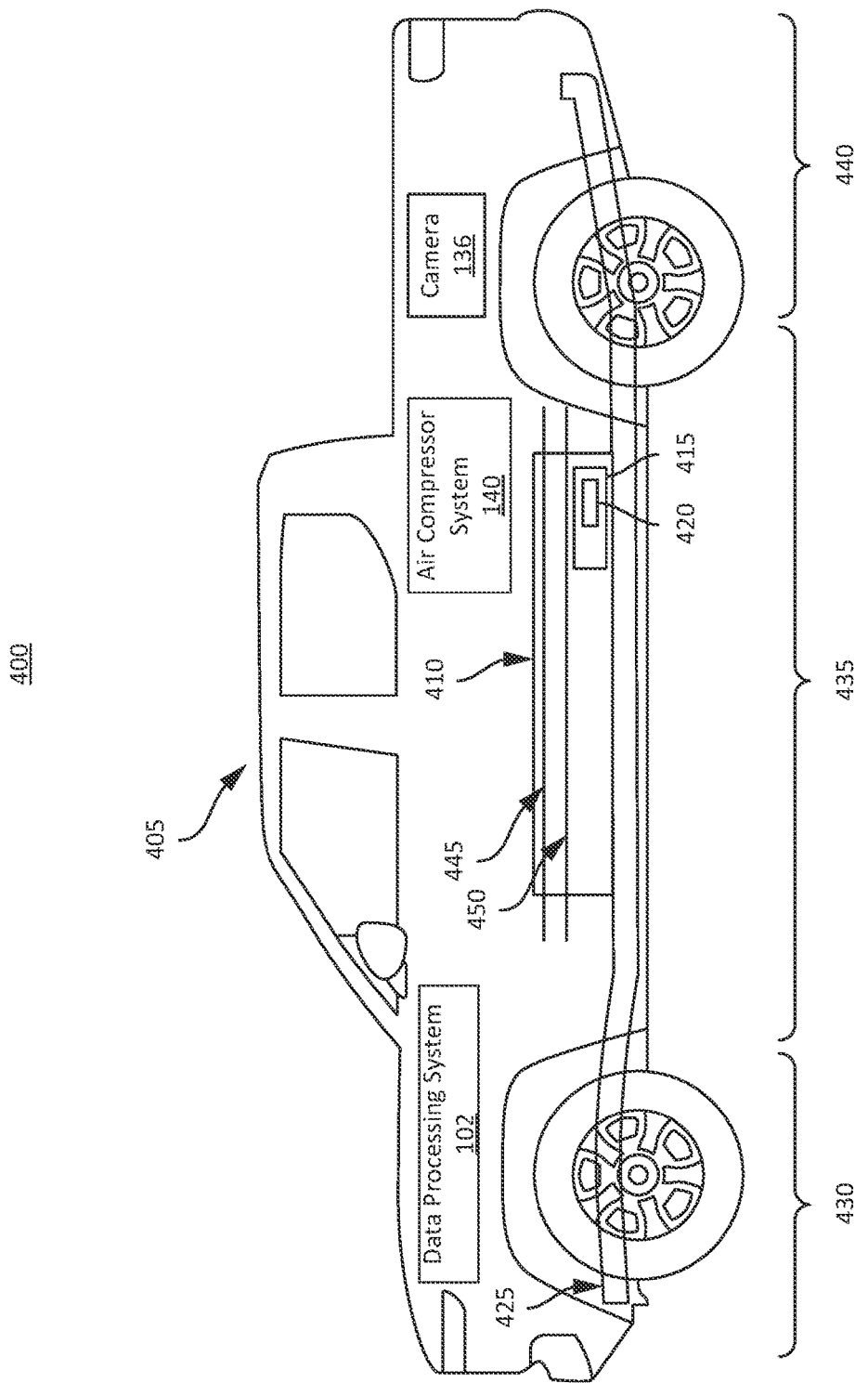
FIG. 4 depicts a cross sectional view of a vehicle.
Figure 15:
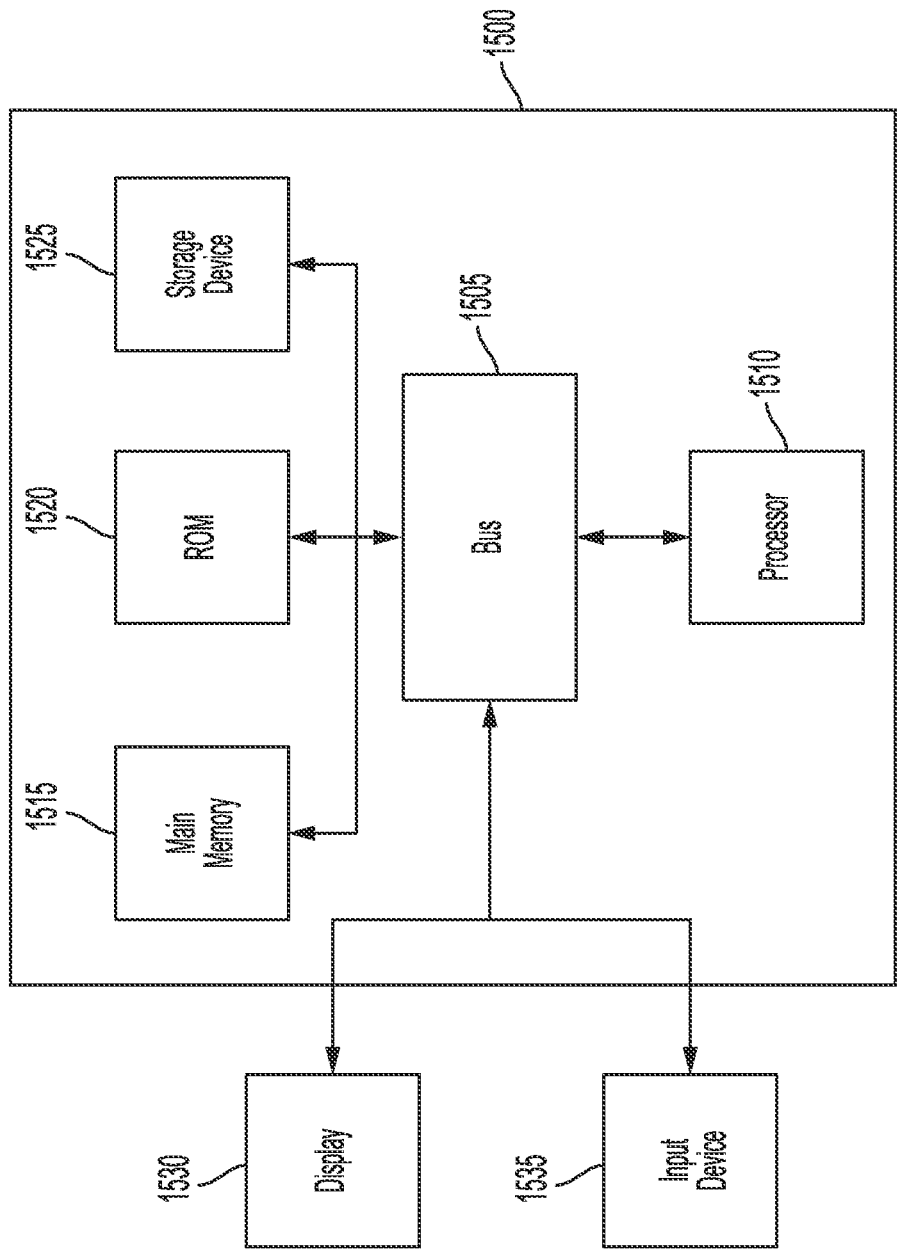
FIG. 15 is a block diagram illustrating an architecture for a computer system that can be employed to implement elements of the systems and methods described and illustrated herein.

FIG. 3 depicts an example method 300 of controlling an air compressor. The method 200 can be performed by one or more system or component depicted in FIG. 1. FIG. 4, or FIG. 15, including, for example, a data processing system. At ACT 305, the data processing system (or one or more processors thereof coupled with memory) can establish a bi-directional connection (e.g., via connection handler 106) with a controller (e.g., controller 146) of an air compressor (e.g., compressor 144) of the vehicle. The data processing system can receive, from the controller (e.g., controller 146) prior to activation of the air compressor (e.g., compressor 144), a first value of a pressure (e.g. from sensor 142) measured for an object coupled to the air compressor. For example, sensor 142 can measure a pressure of a volleyball connected to the compressor 144 and report that pressure measurement (e.g., via performance monitor 116). The data processing system can receive, from the controller (e.g., controller 146) an indication of a value of a temperature (e.g., via sensor 142) measured for the air compressor (e.g., compressor 144). For example, sensor 142 can measure an initial temperature of the compressor 144 and report that measurement via the performance monitor 116.

At ACT 310, the data processing system can present, via a graphical user interface (e.g., interface 104) displayed on a display device, an icon (e.g., icon 130) for a preset (e.g., preset 122) configured with a target pressure (e.g., target pressure 124) for a type of object (e.g., type of object 126). For example, the data processing system can present an icon of a volleyball to the user. The volleyball icon can have configured within it a target pressure of 30 psi and can be recognized as a volleyball type of object.

At ACT 315, the data processing system can transmit, via the bi-directional connection (e.g., via command generator 114) responsive to a selection of the preset (e.g., preset 122), an instruction to the controller (e.g., controller 146) to activate the air compressor (e.g., compressor 144) to inflate. For example, responsive to the selection of a volleyball, the command generator 114 can generate a command to the controller 146 via the bi-directional connection instructing the compressor 144 to inflate.

At ACT 320, the data processing system can inflate the object to the target pressure (e.g., target pressure 124). The data processing system can receive, from the controller (e.g., controller 146) subsequent to transmission of the instruction (e.g., via command generator 114) and activation of the air compressor (e.g., air compressor 144), a second value of a pressure (e.g., via sensors 142) measured for an object coupled to the air compressor. For example, the data processing system can receive a second value of a pressure from the volleyball, subsequent to initial inflation. The data processing system can provide, via the graphical user interface (e.g., interface 104) a progress bar that indicates the first value of the pressure, the second value of the pressure, and the target pressure selected via the preset. The second value of the pressure can be less than the target pressure and the first value of the pressure can be less than the second value of the pressure. For example, the first value of pressure can be the initial pressure reading of the (uninflated) volleyball. For example, the second value of pressure can be the pressure reading of the inflated volleyball. For example, the progress bar can indicate the status of the inflation of the volleyball by comparing the first pressure to the second pressure to the target pressure, displayed on the interface 104.

The data processing system can determine the value of the temperature is greater than or equal to a threshold. If the data processing system determines that the value of the temperature is greater than or equal to a temperature threshold, then the data processing system can present, via the graphical user interface, a notification that indicates the air compressor is deactivated responsive to the value of the temperature greater than or equal to the threshold (e.g., threshold 128 such in the range of 100-150 degrees F.). For example, the performance monitor 116 can determine that the temperature of the compressor 144 has exceeded a threshold 128 for the air compressor. The command generator 114 can then generate an instruction to deactivate the compressor 144 and to display on the interface 104 a notification to the user of the deactivation.

FIG. 4 depicts an example cross-sectional view 400 of an electric vehicle 405 installed with at least one battery pack 410. Electric vehicles 405 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 410 can also be used as an energy storage system to power a building, such as a residential home or commercial building. Electric vehicles 405 can be fully electric or partially electric (e.g., plug-in hybrid) and further, electric vehicles 405 can be fully autonomous, partially autonomous, or unmanned. Electric vehicles 405 can also be human operated or non-autonomous. Electric vehicles 405 such as electric trucks or automobiles can include on-board battery packs 410, batteries 415 or battery modules 415, or battery cells 420 to power the electric vehicles. The electric vehicle 405 can include a chassis 425 (e.g., a frame, internal frame, or support structure). The chassis 425 can support various components of the electric vehicle 405. The chassis 425 can span a front portion 430 (e.g., a hood or bonnet portion), a body portion 435, and a rear portion 440 (e.g., a trunk, payload, or boot portion) of the electric vehicle 405. The battery pack 410 can be installed or placed within the electric vehicle 405. For example, the battery pack 410 can be installed on the chassis 425 of the electric vehicle 405 within one or more of the front portion 130, the body portion 435, or the rear portion 440. The battery pack 410 can include or connect with at least one busbar, e.g., a current collector element. For example, the first busbar 445 and the second busbar 450 can include electrically conductive material to connect or otherwise electrically couple the battery 415, the battery modules 415, or the battery cells 420 with other electrical components of the electric vehicle 405 to provide electrical power to various systems or components of the electric vehicle 405.

The electric vehicle 405 can support a data processing system 102. The data processing system 102 can be as described above in FIG. 1. The data processing system 102 can be powered by the battery 415, the battery modules 415, or the battery cells 420. The data processing system can be located, for example, in the front portion 430, the body portion 435, or the rear portion 440. The data processing system can interact with other systems of the vehicle 405 as described herein.

The electric vehicle 405 can include an air compressor system 140. The air compressor system 140 can be as described above in FIG. 1. The air compressor system can be powered by the battery 415, the battery modules 415, or the battery cells 420. The air compressor system 140 can be operated manually or via a system like system 100 described in FIG. 1. The air compressor system 140 can be located, for example, in the front portion 430, the body portion 435, or the rear portion 440. The air compressor system 140 can be located within an enclosure of the vehicle, sub as a subcompartment, trunk bed, or within the cabin of the vehicle. The air compressor system 140 can include a controller configured to activate the air compressor.

The vehicle 405 can include a display device located within a cabin of the vehicle. The vehicle can include one or more processors coupled with memory to establish a bi-directional connection with the controller. The vehicle can include one or more processors coupled with memory to present, via graphical user interface displayed on the display device, an icon for a preset configured with a target pressure for a type of object. For example, data processing system 102 can contain the one or more processors for displaying the icon for a preset configured with a target pressure for a type of object. The vehicle can transmit, via the bi-directional connection responsive to a selection of the preset, an instruction to the controller to activate the air compressor to inflate the type of object to the target pressure.

The electric vehicle 405 can include a camera 136. The camera 136 can be as described above in FIG. 1. The camera 136 can be powered by the battery 415, the battery modules 415, or the battery cells 420. The camera 136 can be located, for example, in the front portion 430, the body portion 435, or the rear portion 440. The camera 136 can be located on an exterior surface of the vehicle. For example, the camera can be located in a truck bed, attached to a bumper, or on a rear windshield. The vehicle can include one or more processors (such as in data processing system 102) configured to receive, from the camera 136, an image of an object. The vehicle can include one or more processors configured to determine, based on the image, the object correspond to the type of object wherein the type of object comprises a tire of a bike different than the vehicle, an air mattress, or a ball. For example, the camera 136 can take a picture of a volleyball and determine that the volleyball object corresponds to the type of object of a volleyball. The one or more processors can provide, responsive to the determination that the object corresponds to the type of object, the icon for the preset for presentation via the graphical user interface. For example, the camera 136 can present via data processing system 102 the icon of a volleyball to the user.

Figure 5:
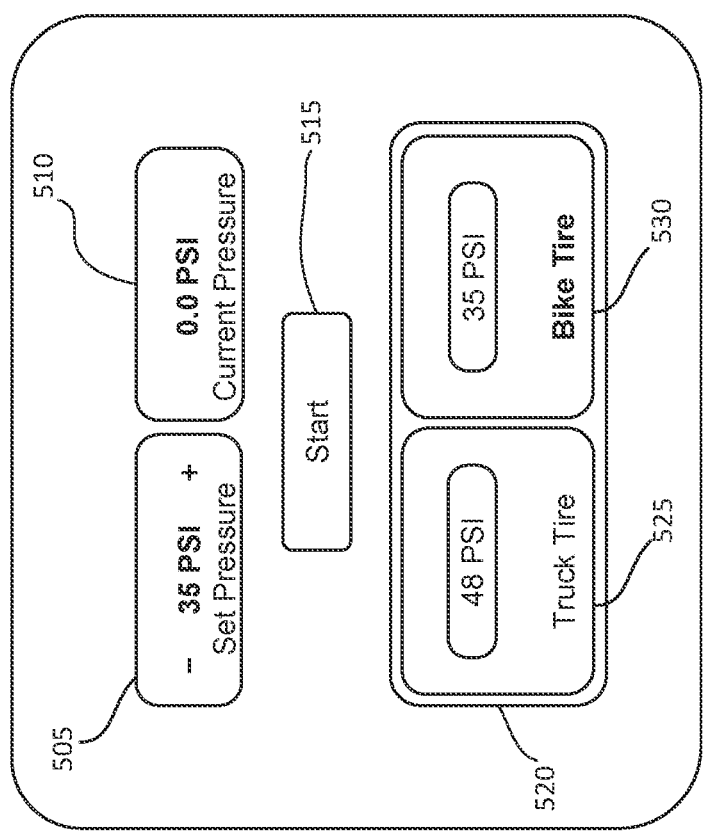
FIG. 5 depicts an example graphical user interface for selecting a preset.

FIG. 5 depicts an example graphical user interface (GUI) 500 for selecting an icon and configuring its target pressure. The GUI 500 can be provided by the data processing system 102 depicted in FIG. 1, such as via interface 104. GUI 500 can include set pressure indicator 505, current pressure indicator 510, start button 515, icon interface 520, truck tire icon 525, or bike tire icon 530.

Set pressure indicator 505 can be an interface, button, indicator, display, or light for displaying and changing the target pressure of a preset. For example, the set pressure indicator 505 can include an interface to change the target pressure from 30 to 35 psi.

Current pressure indicator 510 can be an interface, button, indicator, display, or light for displaying the current pressure of an object to be inflated. Current pressure indicator 510 may change dynamically in response to the ongoing inflation of the inflatable object. For example, the current pressure 510 can display a current pressure of 0 psi if the object to inflate is completely deflated, and then may display an incrementing current pressure as the inflation progresses.

Start button 515 can be an interface, button, or selectable icon for the user to begin inflation. For example, the user may select start button 515 to begin inflation of a volleyball to the set pressure indicated in set pressure indicator 505.

Icon interface 520 can include icons 525 and 530. Icon interface can include fewer or more icons than displayed in example GUI 500. Icon interface can include selectable icons. Selectable icons can include truck tire icon 525 and bike tire icon 530. Icons 525 and 530 can be examples of a plurality of icons of objects to inflate. Icons 525 and 530 can include an adjustable target pressure.

Figure 6:
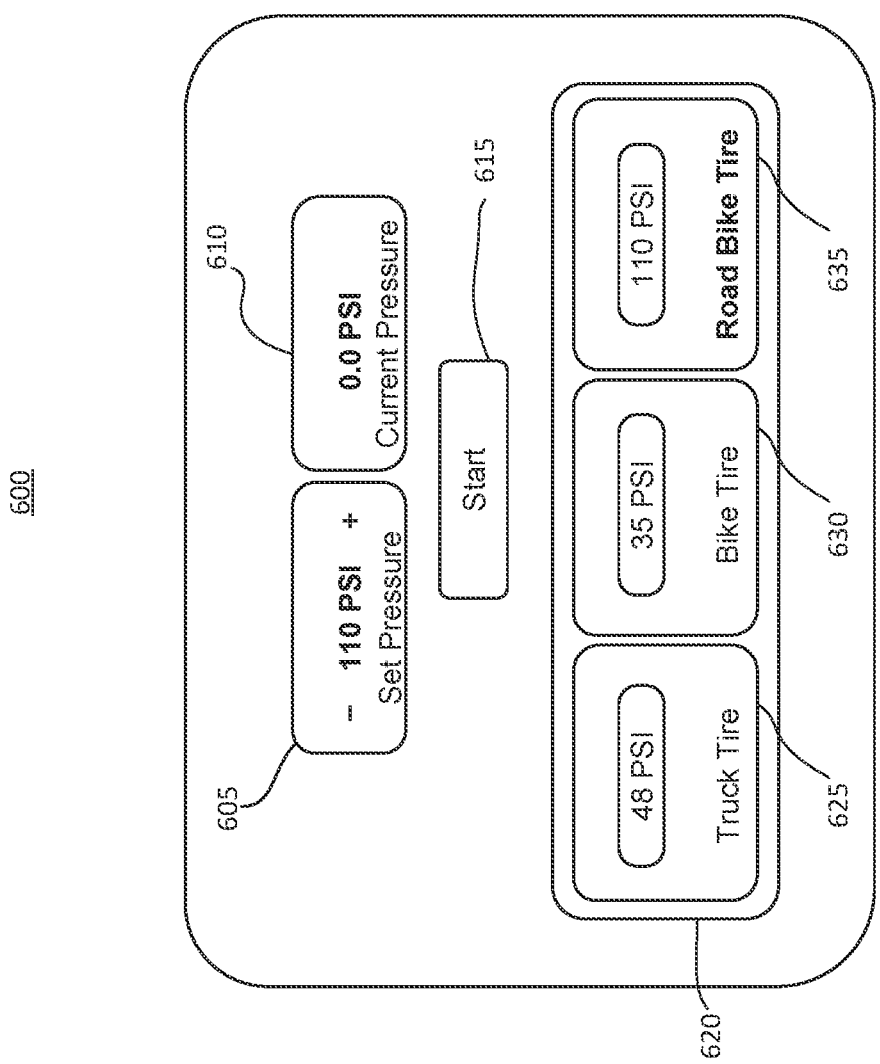
FIG. 6 depicts an example graphical user interface for selecting a preset.

FIG. 6 depicts an example graphical user interface (GUI) 600 for selecting an icon and configuring its target pressure. The GUI 600 can be provided by the data processing system 102 depicted in FIG. 1, such as via interface 104. GUI 600 can include set pressure indicator 605, current pressure indicator 610, start button 615, icon interface 620, truck tire icon 625, bike tire icon 630, and road bike tire icon 635.

Set pressure indicator 605 can be an interface, button, indicator, display, or light for displaying and changing the target pressure of a preset. For example, the set pressure indicator 505 can include an interface to change the target pressure from 30 to 35 psi.

Current pressure indicator 610 can be an interface, button, indicator, display, or light for displaying the current pressure of an object to be inflated. Current pressure indicator 610 may change dynamically in response to the ongoing inflation of the inflatable object. For example, the current pressure 610 can display a current pressure of 0 psi if the object to inflate is completely deflated, and then may display an incrementing current pressure as the inflation progresses.

Start button 615 can be an interface, button, or selectable icon for the user to begin inflation. For example, the user may select start button 615 to begin inflation of a volleyball to the set pressure indicated in set pressure indicator 605.

Icon interface 620 can include icons 625 and 630. Icon interface can include fewer or more icons than displayed in example GUI 600. Icon interface can include selectable icons. Selectable icons can include truck tire icon 625 bike tire icon 630, and road bike tire icon 635. Icons 625, 630 and 635 can be examples of a plurality of icons of objects to inflate. Icons 625, 630 and 635 can include an adjustable target pressure.

Figure 7:
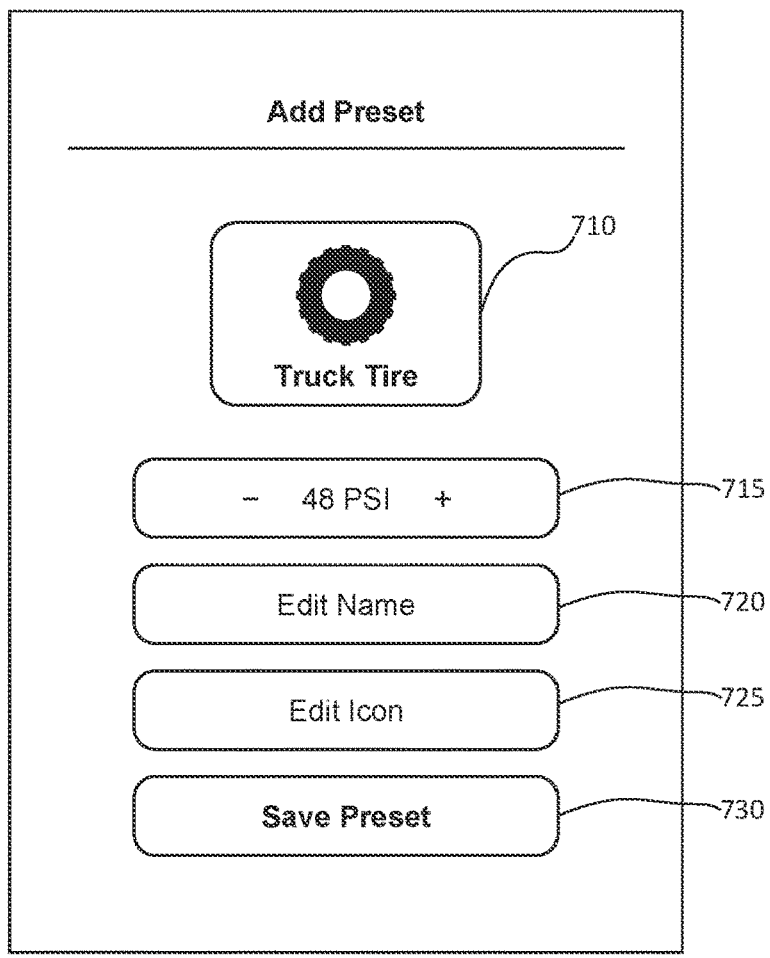
FIG. 7 depicts an example graphical user interface for adding a preset.

FIG. 7 depicts an example GUI 700 for adding a new preset. GUI 700 can include icon 710, target pressure selector 715, name editor 720, icon editor 725, and save preset button 730. GUI can be used, for example, to add a preset to the GUI depicted in FIGS. 5 and 6. The GUI 700 can be provided by the data processing system 102 depicted in FIG. 1, such as via interface 104.

Icon 710 can be any of a plurality of preprogrammed images for conveying the type of inflatable object. Icon 710 can be in color, black and white, graphical, or photographic. Target pressure selector 715 can be used to modify the target pressure associated with the preset. Target pressure selector 715 can be limited to a range of target pressures for the selected type of object. For example, target pressure selector can limit the target pressure of a truck tire from 20 psi to 50 psi. Name editor 720 can include an interface for updating the name of the preset. Selection of name editor 720 can include a keyboard, drop down menu, or other interface for inputting an alphanumeric name for the user to identify the preset configuration. Icon editor 725 can include an interface for updating the icon (such as icon 710) associated with the preset. Selection of icon editor 725 can include a drop down menu, listing of icons by name or image, or other interface for inputting an icon for the user to identify the preset configuration. Save preset button 730 can be any selectable button for choosing to store the new preset in memory.

Figure 8:
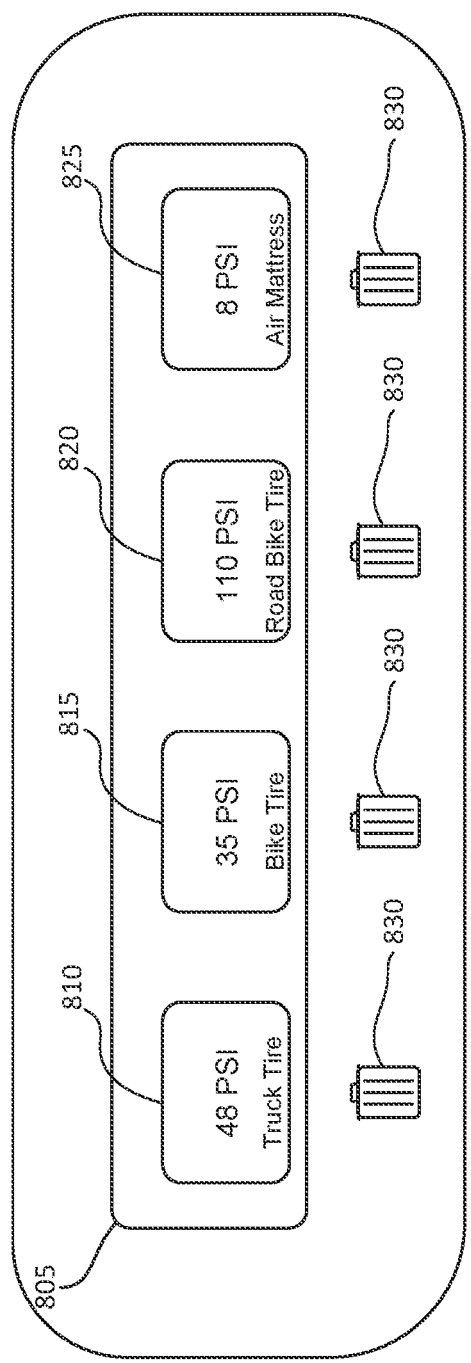
FIG. 8 depicts an example graphical user interface for deleting a preset.

FIG. 8 depicts an example GUI 800 for deleting a preset. GUI 800 can include preset interface 805, examples presets 810, 815, 820, and 825, and deletion button 830. GUI 800 can be used to delete presets from displaying in icon interface 520 and 620, depicted in FIGS. 5 and 6 respectively. The GUI 800 can be provided by the data processing system 102 depicted in FIG. 1, such as via interface 104.

Preset interface 805 can include example presets such as truck tire preset 810, bike tire preset 815, road bike tire preset 820, and air mattress preset 825. Preset interface 805 can include fewer or more presets not depicted herein. Each of these example presets can have associated with them a target pressure. Each of these example presets can have a deletion button 830 associated with them. The deletion button 830 can be any button, icon, or selection means for deleting a specific preset from the preset interface 805.

FIG. 9 depicts an example GUI 900 for indicating inflation progress. GUI 900 can include a progress bar for indicating to the user the status of the inflation. GUI 900 can include progress bar 915, current pressure indicator 905, process indicator 925, target pressure 124, and starting pressure 920. The GUI 900 can be provided by the data processing system 102 depicted in FIG. 1, such as via interface 104.

Progress bar 915 can be any type of display that indicates to the user the current status of inflation. Progress bar 915 can dynamically change in response to the current inflation pressure of the inflatable object. Progress bar 915 can include starting pressure 920. Starting pressure 920 can refer to the initial measured pressure of the inflatable object. Starting pressure 920 can indicate the lower bound of progress bar 915. Progress bar 915 can include target pressure 124. Target pressure 124 can be a configurable desired pressure for the inflatable object. Target pressure 124 can be configured by any of the means depicted in FIG. 5, 6 or 7, or by any other means. Target pressure 124 can behave as described above in FIG. 1. Target pressure 124 can indicate the upper bound of progress bar 915.

GUI 900 can include current pressure indicator 905. Current pressure indicator 905 can display a numerical reference for the current pressure of the inflatable object. Current pressure indicator 905 can dynamically change as the inflation progresses.

GUI 900 can include process indicator 925. Process indicator 925 can display a plurality of notifications to the user informing them of the current status of inflation. For example, process indicator 925 can display "Inflating . . . " to the user to inform them that the inflation process is underway. For example, process indicator 925 can display to the user when inflation is completed, paused, or has any other change in status. Process indicator 925 can indicate status graphically, with text, images, or by any other means understandable to the user.

FIG. 10 depicts an example GUI 1000 for indicating inflation progress. GUI 1000 can include a progress bar 1005, current pressure bar 1010, starting pressure 1015, target pressure 124, and current pressure indicator 1020. The GUI 1000 can be provided by the data processing system 102 depicted in FIG. 1, such as via interface 104.

Progress bar 1005 can be any type of display that indicates to the user the current status of inflation. Progress bar 1005 can dynamically change in response to the current inflation pressure of the inflatable object. Progress bar 1005 can include starting pressure 1015. Starting pressure 1015 can refer to the initial measured pressure of the inflatable object. Starting pressure 1015 can indicate the lower bound of progress bar 1005. Progress bar 1005 can include current pressure bar 1010. Current pressure bar 1010 can be a graphical display for indicating to the user the current pressure of the inflatable object. Progress bar 1005 can include target pressure 124. Target pressure 124 can be a configurable desired pressure for the inflatable object. Target pressure 124 can be configured by any of the means depicted in FIG. 5, 6 or 7, or by any other means. Target pressure 124 can behave as described above in FIG. 1. Target pressure 124 can indicate the upper bound of progress bar 1005.

GUI 1000 can include current pressure indicator 1020. Current pressure indicator 1020 can display a numerical reference for the current pressure of the inflatable object. Current pressure indicator 1020 can dynamically change as the inflation progresses. Current pressure indicator 1020 can change proportionally to current pressure bar 1010.

Figure 11:
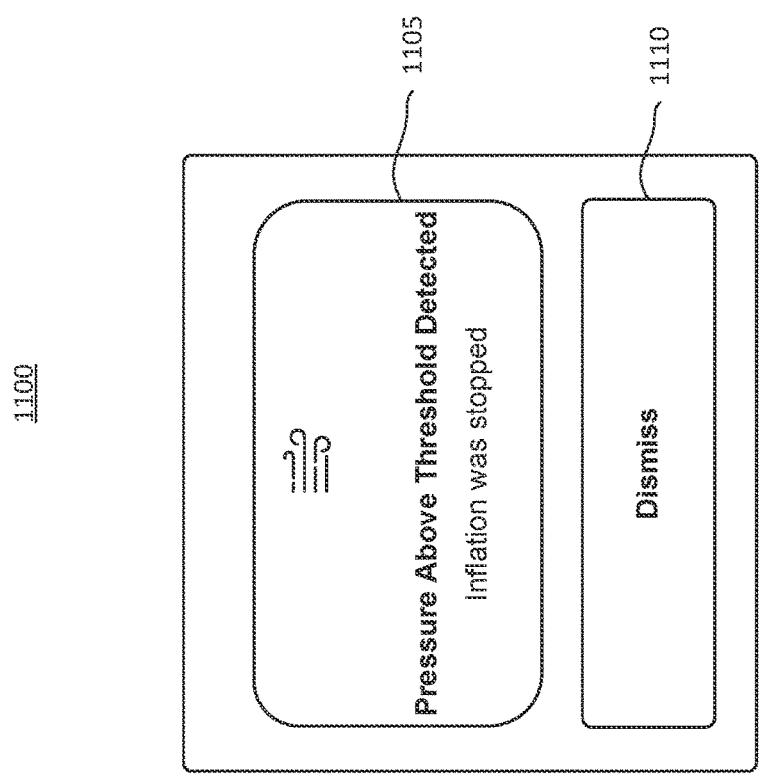
FIG. 11 depicts an example graphical user interface for displaying a notification.

FIG. 11 depicts an example GUI 1100 for displaying a notification to the user. GUI 1100 can include a notice 1105 and a dismiss button 1110. The GUI 1100 can be provided by the data processing system 102 depicted in FIG. 1, such as via interface 104. GUI 1100 can display in response to an indication from the system 100 that there is an interruption in the inflation sequence, such as completion of inflation, exceeding the time threshold, or exceeding the temperature threshold. Notice 1105 can display text, an icon, a widget, or an animation to indicate to the user that an occurrence outside of normal inflation has occurred. Dismiss button 1110 can be any user selectable icon, button, or interface for dismissing the notice 1105.

Figure 12:
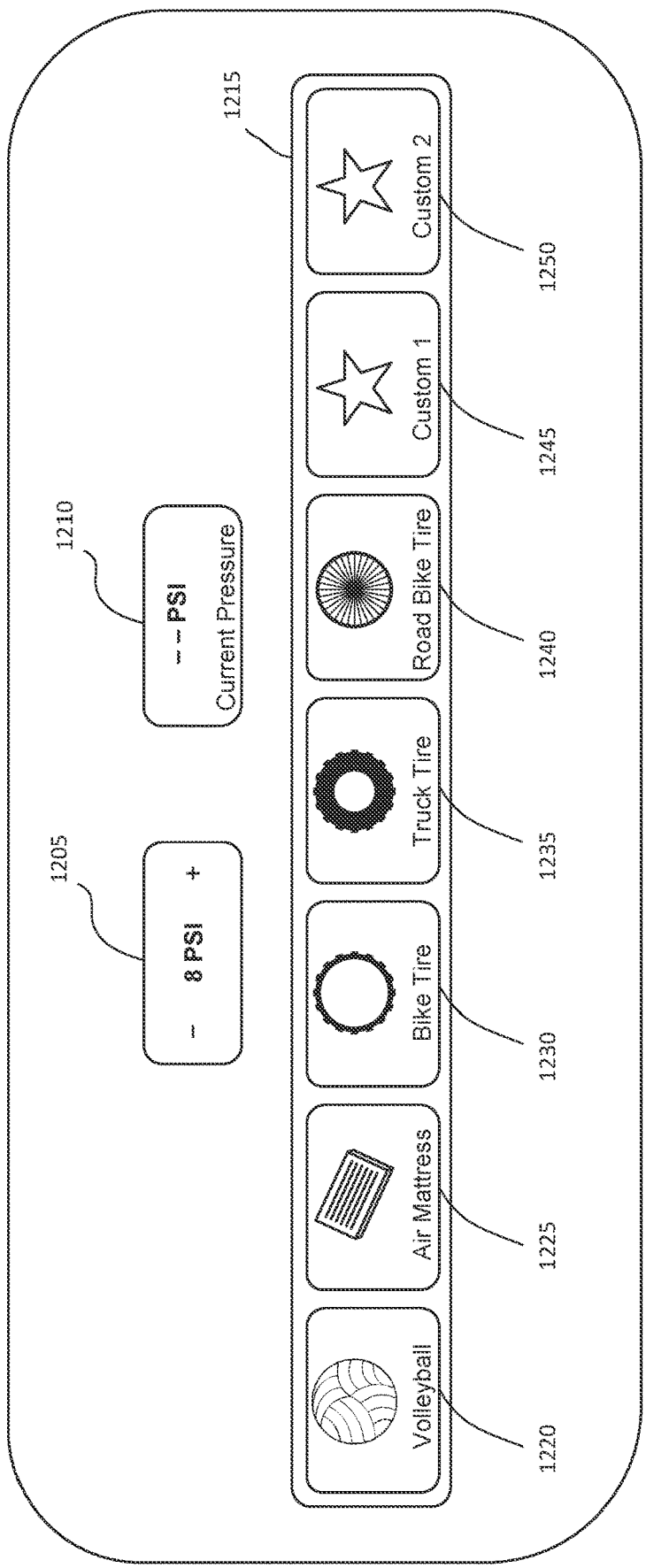
FIG. 12 depicts an example graphical user interface for selecting a preset.

FIG. 12 depicts an example graphical user interface (GUI) 1200 for selecting an icon and configuring its target pressure. The GUI 1200 can be provided by the data processing system 102 depicted in FIG. 1, such as via interface 104. GUI 1200 can include set pressure indicator 1205, current pressure indicator 1210, icon interface 1215, volleyball icon 1220, air mattress icon 1225, bike tire icon 1230, truck tire icon 1235, road bike tire icon 1240, a first custom icon 1245, and a second custom icon 1250.

Set pressure indicator 1205 can be an interface, button, indicator, display, or light for displaying and changing the target pressure of a preset. For example, the set pressure indicator 1205 can include an interface to change the target pressure from 4 to 8 psi.

Current pressure indicator 1210 can be an interface, button, indicator, display, or light for displaying the current pressure of an object to be inflated. Current pressure indicator 1210 may change dynamically in response to the ongoing inflation of the inflatable object. For example, the current pressure 1210 can display a current pressure of 0 psi if the object to inflate is completely deflated, and then may display an incrementing current pressure as the inflation progresses.

Icon interface 1215 can include icons 1220, 1225, 1230, 1235, 1240, 1245, and 1250. Icon interface can include fewer or more icons than displayed in example GUI 1200. Icon interface can include selectable icons. Selectable icons can include, volleyball icon 1220, air mattress icon 1225, bike tire icon 1230, truck tire icon 1235, road bike tire icon 1240, custom icon 1 1245, and custom icon 2 1250. The icons 1225 through 1250 can be examples of a plurality of icons of objects to inflate. The icons 1225 through 1250 can include an adjustable target pressure.

Figure 13:
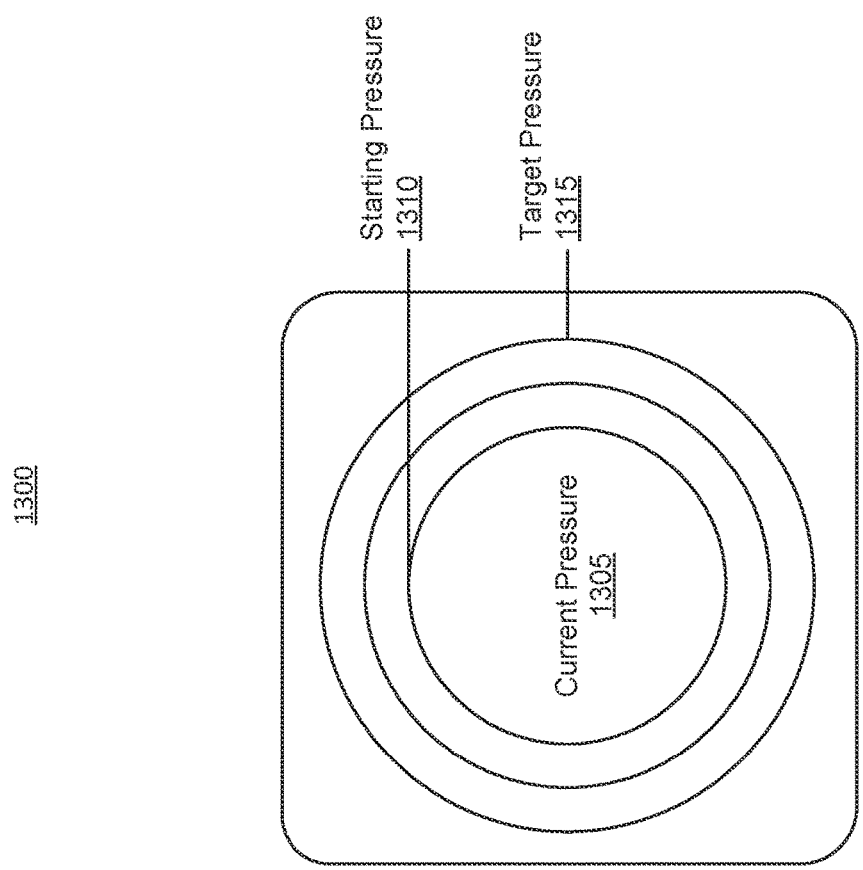
FIG. 13 depicts an example graphical user interface for indicating inflation progress.

FIG. 13 depicts an example GUI for indicating inflation progress. GUI 1300 can include, current pressure 1305, starting pressure 1310, and target pressure 1315. The GUI 1300 can be provided by the data processing system 102 depicted in FIG. 1, such as via interface 104.

Starting pressure 1310 can refer to the initial measured pressure of the inflatable object. Starting pressure 1310 can indicate the lower bound of GUI 1300. GUI 1300 can include current pressure 1305. Current pressure 1305 can be a graphical display for indicating to the user the current pressure of the inflatable object. Current pressure 1305 can dynamically change as the inflation of the object progresses. GUI 1300 can include target pressure 1315. Target pressure 1315 can be a configurable desired pressure for the inflatable object. Target pressure 1315 can be configured by any of the means depicted in FIG. 5, 6 or 7, or by any other means. Target pressure 1315 can indicate the upper bound of GUI 1300.

Figure 14:
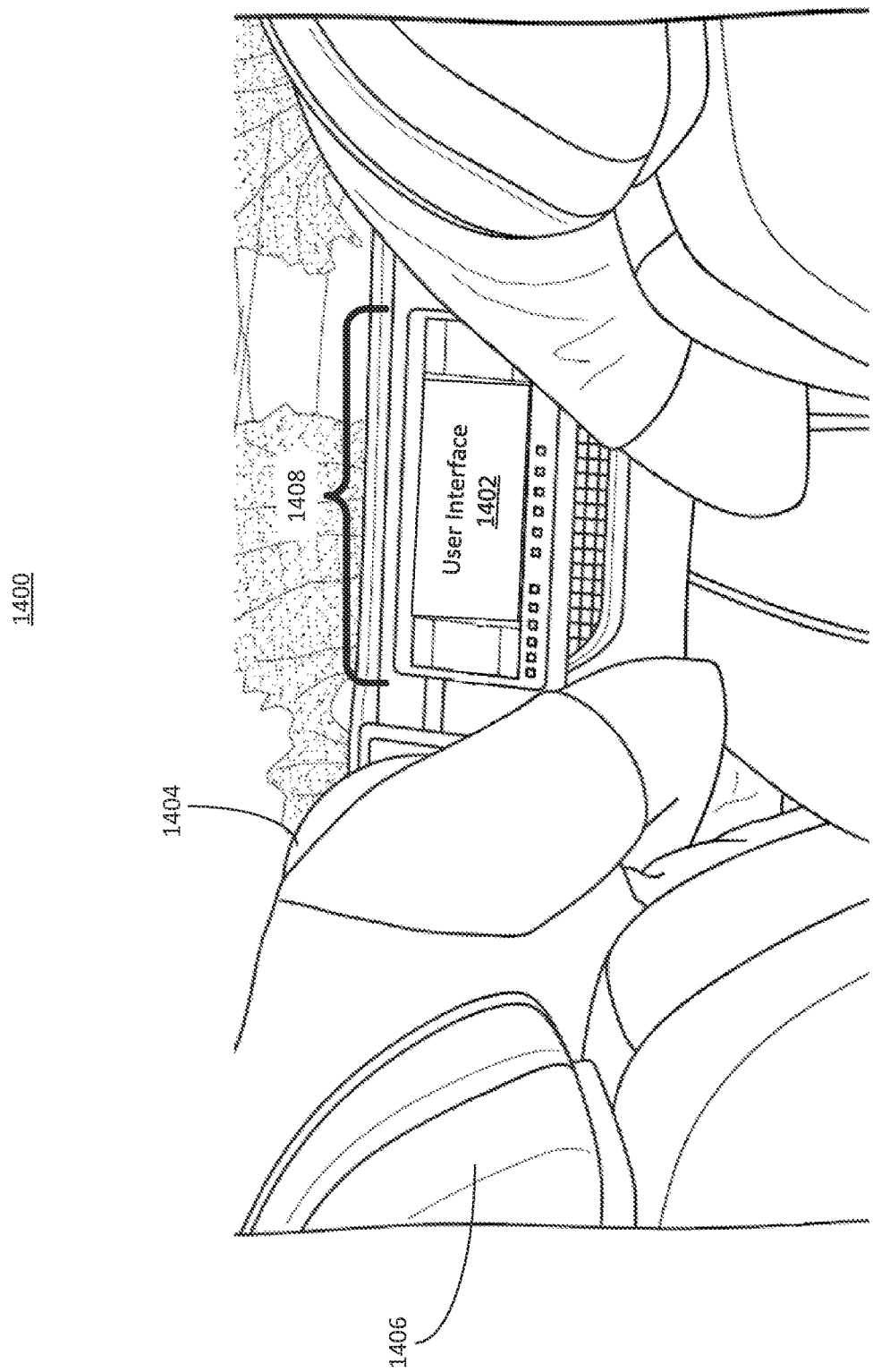
FIG. 14 depicts an example user interface located on a dashboard of a vehicle.

FIG. 14 depicts an example 1400 of a user interface 1402 located on a dashboard 1408 of a vehicle. The vehicle can, for example, include vehicle 405 depicted in FIG. 4. The user interface 1402 can refer to, include, or provide one or more of the user interfaces depicted in FIGS. 5-13, including, for example, user interface 500, user interface 600, user interface 700, user interface 800, user interface 900, user interface 1000, user interface 1100, user interface 1200, or user interface 1300. The user interface 1402 can provide one or more functionality to facilitate controlling an air compressor, including selecting presets, adding presets, modifying presets, presenting real-time performance information, providing notifications, activating the air compressor, deactivating the compressor, establishing a bi-directional communication channel, or other function or aspect of a system or component depicted in FIG. 1.

The user interface 1402 can be located on a dashboard 1408 of the vehicle. The user interface 1402 can be located in front of a seat 1406. The dashboard 1408 can be located adjacent, proximate to, or otherwise near a steering wheel 1404 of the vehicle. The dashboard 1408, and user interface 1402, can be accessible by a driver of the vehicle while the driver is sitting in the driver seat 1406.

FIG. 15 depicts an example block diagram of an example computer system 1500. The computer system or computing device 1500 can include or be used to implement a data processing system (e.g., data processing system 102) or its components. The computing system 1500 includes at least one bus 1505 or other communication component for communicating information and at least one processor 1510 or processing circuit coupled to the bus 1505 for processing information. The computing system 1500 can also include one or more processors 1510 or processing circuits coupled to the bus for processing information. The computing system 1500 also includes at least one main memory 1515, such as a random access memory (RAM) or other dynamic storage device, coupled to the bus 1505 for storing information, and instructions to be executed by the processor 1510. The main memory 1515 can be used for storing information during execution of instructions by the processor 1510. The computing system 1500 may further include at least one read only memory (ROM) 1520 or other static storage device coupled to the bus 1505 for storing static information and instructions for the processor 1510. A storage device 1525, such as a solid state device, magnetic disk or optical disk, can be coupled to the bus 1505 to persistently store information and instructions.

The computing system 1500 may be coupled via the bus 1505 to a display 1530, such as a liquid crystal display, or active matrix display, for displaying information to a user such as a driver of the electric vehicle 405 or other end user. An input device 1535, such as a keyboard or voice interface may be coupled to the bus 1505 for communicating information and commands to the processor 1510. The input device 1535 can include a touch screen display 1530. The input device 1535 can also include a cursor control, such as a mouse, a trackball, or cursor direction keys, for communicating direction information and command selections to the processor 1510 and for controlling cursor movement on the display 1535.

The processes, systems and methods described herein can be implemented by the computing system 1500 in response to the processor 1510 executing an arrangement of instructions contained in main memory 1515. Such instructions can be read into main memory 1515 from another computer-readable medium, such as the storage device 1525. Execution of the arrangement of instructions contained in main memory 1515 causes the computing system 1500 to perform the illustrative processes described herein. One or more processors in a multi-processing arrangement may also be employed to execute the instructions contained in main memory 1515. Hard-wired circuitry can be used in place of or in combination with software instructions together with the systems and methods described herein. Systems and methods described herein are not limited to any specific combination of hardware circuitry and software.

Although an example computing system has been described in FIG. 15, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
a data processing system of a vehicle, the data processing system comprising one or more processors coupled with memory and configured to execute instructions to:
establish a bi-directional connection with a controller of an air compressor of the vehicle;
present, via a graphical user interface displayed on a display device:
an icon for a preset configured with a target pressure for a type of object; and
a second icon to activate the air compressor in a free flowing air mode without any target pressure for an object coupled to the air compressor;
transmit, via the bi-directional connection responsive to a selection of the preset, an instruction to the controller to activate the air compressor to inflate the type of object to the target pressure;
prevent the activation of the air compressor based on the pressure measured for the object exceeding a threshold; and
present, via the graphical user interface, a notification that indicates the air compressor is deactivated responsive to the prevention.

2. The system of claim 1, wherein the bi-directional connection is wireless.

3. The system of claim 1, wherein the display device is located within a cabin of the vehicle.

4. The system of claim 1, wherein the vehicle comprises a truck with a bed, and the display device is located on the bed of the truck.

5. The system of claim 1, wherein the one or more processors are configured to execute instructions to:
provide the graphical user interface via an application executed by a computing device remote from the data processing system, the computing device coupled to the display device.

6. The system of claim 1, wherein the one or more processors are configured to execute instructions to:
receive, from the controller prior to activation of the air compressor, a first value of a pressure measured for an object coupled to the air compressor;
receive, from the controller subsequent to transmission of the instruction and activation of the air compressor, a second value of a pressure measured for an object coupled to the air compressor; and
provide, via the graphical user interface, a progress bar that indicates the first value of the pressure, the second value of the pressure, and the target pressure selected via the preset, wherein the second value of the pressure is less than the target pressure and the first value of the pressure is less than the second value of the pressure.

7. The system of claim 1, wherein the one or more processors are configured to execute instructions to:
receive, from the controller, an indication of a value of a temperature measured for the air compressor;
determine the value of the temperature is greater than or equal to a threshold; and
present, via the graphical user interface, a notification that indicates the air compressor is deactivated responsive to the value of the temperature greater than or equal to the threshold.

8. The system of claim 1, wherein the one or more processors are configured to execute instructions to:
receive, from a camera of the vehicle, an image of an object;
determine, based on the image, the object corresponds to the type of object; and
provide, responsive to the determination that the object corresponds to the type of object, the icon for the preset for presentation via the graphical user interface.

9. The system of claim 1, wherein the one or more processors are configured to execute instructions to:
receive an indication that the vehicle is in an off-road mode; and
select, for presentation via the graphical user interface, the preset with the target pressure based on the off-road mode of the vehicle.

10. The system of claim 1, wherein the one or more processors are configured to execute instructions to:
receive, from the controller subsequent to transmission of the instruction and activation of the air compressor, a value of a pressure measured for an object coupled to the air compressor, the value of the pressure less than the target pressure;
determine a duration of activity of the air compressor is greater than or equal to a threshold;
transmit a second instruction to the controller to deactivate the air compressor responsive to the duration of activity greater than or equal to the threshold and the pressure less than the target pressure; and
provide, via the graphical user interface, a notification that indicates the deactivation of the air compressor responsive to the duration of activity greater than or equal to the threshold and the pressure less than the target pressure.

11. The system of claim 1, wherein the one or more processors are configured to execute instructions to:
receive, via the graphical user interface, a request to add a second preset;
receive, via the graphical user interface, an indication of a second type of object for the second preset, the second type of object different from the type of object;
provide, via the graphical user interface, a range of target pressures selected based on the second type of object;
receive, via the graphical user interface, a selection of a second target pressure within the range of target pressures; and
establish the second preset configured with the second target pressure for the second type of object.

12. The system of claim 1, wherein the type of object comprises a tire of the vehicle, a tire of a bike different than the vehicle, an air mattress, or a ball.

13. The system of claim 1, wherein the one or more processors are configured to execute instructions to:
store, in a data structure in the memory, the preset comprising the target pressure, the type of object, and a mode of operation.

14. A method, comprising:
establishing, by one or more processors of a vehicle coupled with memory, a bi-directional connection with a controller of an air compressor of the vehicle;
presenting, by the one or more processors via a graphical user interface displayed on a display device:
  an icon for a preset configured with a target pressure for a type of object; and
  a second icon to activate the air compressor in a free flowing air mode without any target pressure for an object coupled to the air compressor; and
transmitting, by the one or more processors via the bi-directional connection responsive to a selection of the preset, an instruction to the controller to activate the air compressor to inflate the type of object to the target pressure;
preventing, by the one or more processors, the activation of the air compressor based on the pressure measured for the object exceeding a threshold; and
presenting, via the graphical user interface, a notification that indicates the air compressor is deactivated responsive to the prevention.

15. The method of claim 14, comprising:
receiving, by the one or more processors from the controller prior to activation of the air compressor, a first value of a pressure measured for an object coupled to the air compressor;
receiving, by the one or more processors from the controller subsequent to transmission of the instruction and activation of the air compressor, a second value of a pressure measured for an object coupled to the air compressor; and
  providing, by the one or more processors via the graphical user interface, a progress bar that indicates the first value of the pressure, the second value of the pressure, and the target pressure selected via the preset, wherein the second value of the pressure is less than the target pressure and the first value of the pressure is less than the second value of the pressure.

16. The method of claim 14, comprising:
receiving, by the one or more processors from the controller, an indication of a value of a temperature measured for the air compressor;
determining, by the one or more processors, the value of the temperature is greater than or equal to a threshold; and
presenting, by the one or more processors via the graphical user interface, a notification that indicates the air compressor is deactivated responsive to the value of the temperature greater than or equal to the threshold.

17. A vehicle, comprising:
an air compressor located within an enclosure of the vehicle;
a controller configured to activate the air compressor;
a display device located within a cabin of the vehicle; and
one or more processors coupled with memory to:
  establish a bi-directional connection with the controller;
  present, via a graphical user interface displayed on the display device:
    an icon for a preset configured with a target pressure for a type of object; and
    a second icon to activate the air compressor in a free flowing air mode without any target pressure for an object coupled to the air compressor;
  transmit, via the bi-directional connection responsive to a selection of the preset, an instruction to the controller to activate the air compressor to inflate the type of object to the target pressure;
  prevent the activation of the air compressor based on the pressure measured for the object exceeding a threshold; and
  present, via the graphical user interface, a notification that indicates the air compressor is deactivated responsive to the prevention.

18. The vehicle of claim 17, comprising:
a camera located on an exterior surface of the vehicle; and
the one or more processors further configured to:
  receive, from the camera, an image of an object;
  determine, based on the image, the object corresponds to the type of object wherein the type of object comprises a tire of a bike different than the vehicle, an air mattress, or a ball; and
  provide, responsive to the determination that the object corresponds to the type of object, the icon for the preset for presentation via the graphical user interface.

* * * * *